United States Patent
Mizusawa

(10) Patent No.: US 9,686,751 B2
(45) Date of Patent: Jun. 20, 2017

(54) COMMUNICATION CONTROL APPARATUS, COMMUNICATION CONTROL METHOD, TERMINAL APPARATUS, AND INFORMATION PROCESSING APPARATUS

(71) Applicant: SONY CORPORATION, Tokyo (JP)

(72) Inventor: Nishiki Mizusawa, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 14/916,000

(22) PCT Filed: Aug. 12, 2014

(86) PCT No.: PCT/JP2014/071255
§ 371 (c)(1),
(2) Date: Mar. 2, 2016

(87) PCT Pub. No.: WO2015/045659
PCT Pub. Date: Apr. 2, 2015

(65) Prior Publication Data
US 2016/0205633 A1    Jul. 14, 2016

(30) Foreign Application Priority Data

Sep. 30, 2013   (JP) ................................. 2013-204647

(51) Int. Cl.
*H04B 1/00*    (2006.01)
*H04W 52/14*    (2009.01)
(Continued)

(52) U.S. Cl.
CPC ........ *H04W 52/146* (2013.01); *H04B 7/0404* (2013.01); *H04B 7/0456* (2013.01); *H04B 7/0617* (2013.01); *H04W 52/42* (2013.01)

(58) Field of Classification Search
CPC .... H04B 7/0626; H04B 7/086; H04B 7/0408; H04B 7/0695; H04B 7/088; H04W 52/146; H04W 52/367
(Continued)

(56) References Cited

U.S. PATENT DOCUMENTS

2004/0152420 A1    8/2004   Redi et al.
2006/0084460 A1    4/2006   Matsuo et al.
(Continued)

FOREIGN PATENT DOCUMENTS

CA    2 678 546 A1    9/2008
EP    2 442 617 A1    4/2012
(Continued)

OTHER PUBLICATIONS

International Search Report Issued Nov. 11, 2014 in PCT/JP14/71255 Filed Aug. 12, 2014.
(Continued)

*Primary Examiner* — Tu X Nguyen
(74) *Attorney, Agent, or Firm* — Oblon, McClelland, Maier & Neustadt, L.L.P.

(57) ABSTRACT

[Object] To make it possible to perform uplink transmission using appropriate transmission power in the case where a beamforming process is performed.
[Solution] There is provided a communication control apparatus including an acquisition unit configured to acquire control information for determining uplink transmission power; and a communication control unit configured to control transmission of the control information to a terminal apparatus. The control information includes adjustment information for adjusting transmission power according to an antenna gain in a case where a beamforming process is performed.

20 Claims, 19 Drawing Sheets

(51) Int. Cl.
*H04B 7/0404* (2017.01)
*H04W 52/42* (2009.01)
*H04B 7/06* (2006.01)
*H04B 7/0456* (2017.01)

(58) Field of Classification Search
USPC .............................. 455/13.4, 522, 25, 63.4
See application file for complete search history.

(56) References Cited

U.S. PATENT DOCUMENTS

2013/0217404 A1* 8/2013 Jung .................. H04W 72/08
455/452.1
2013/0329829 A1 12/2013 Yokomakura et al.

FOREIGN PATENT DOCUMENTS

JP 2012-175502 9/2012
JP 2013-519313 A 5/2013

OTHER PUBLICATIONS

Office Action issued in Japanese Patent Application No. 2015-539012, dated Mar. 14, 2017. With computer-generated English translation from Global Dossier (3 pages)
Extended European Search Report issued in European Application No. EP 14 84 7984, dated Apr. 21, 2017. (11 pages).

* cited by examiner

FIG.3

| CODEBOOK INDEX | NUMBER OF LAYERS v | |
|---|---|---|
| | 1 | 2 |
| 0 | $\frac{1}{\sqrt{2}}\begin{bmatrix}1\\1\end{bmatrix}$ | $\frac{1}{\sqrt{2}}\begin{bmatrix}1 & 0\\0 & 1\end{bmatrix}$ |
| 1 | $\frac{1}{\sqrt{2}}\begin{bmatrix}1\\-1\end{bmatrix}$ | $\frac{1}{\sqrt{2}}\begin{bmatrix}1 & 1\\1 & -1\end{bmatrix}$ |
| 2 | $\frac{1}{\sqrt{2}}\begin{bmatrix}1\\j\end{bmatrix}$ | $\frac{1}{\sqrt{2}}\begin{bmatrix}1 & 1\\j & -j\end{bmatrix}$ |
| 3 | $\frac{1}{\sqrt{2}}\begin{bmatrix}1\\-j\end{bmatrix}$ | — |

COMMUNICATION CONTROL APPARATUS, COMMUNICATION CONTROL METHOD, TERMINAL APPARATUS, AND INFORMATION PROCESSING APPARATUS

TECHNICAL FIELD

The present disclosure relates to communication control apparatuses, communication control methods, terminal apparatuses, and information processing apparatuses.

BACKGROUND ART

A technique called "beamforming" has in recent years been widely known, which is used by a base station having a plurality of antenna elements to form a beam aimed at a terminal apparatus using the plurality of antenna elements. For example, Long Term Evolution (LTE) release 10 specifies that a base station is equipped with eight antennas.

According to beamforming, a beam aimed in a desired direction is formed by multiplying a signal of each antenna element by a weight coefficient. For example, in LTE, a terminal apparatus selects a recommended set from sets of weight coefficients (i.e., precoding matrices) contained in a code book, on the basis of reception of a reference signal transmitted by a base station, and notifies the base station of the recommended set. Alternatively, a base station calculates a set of weight coefficients on the basis of reception of a reference signal transmitted by a terminal apparatus.

For example, Patent Literature 1 discloses a technique of causing a terminal apparatus to transmit an uplink signal using a directional beam in order to avoid interference of the uplink signal with other signals.

CITATION LIST

Patent Literature

Patent Literature 1: JP 2013-519313T

SUMMARY OF INVENTION

Technical Problem

However, in the background art, when a beamforming process is performed, the level of uplink transmission power may not be appropriate.

For example, as disclosed in Patent Literature 1, a terminal apparatus may transmit an uplink signal using a directional beam. However, a terminal apparatus cannot be equipped with a large number of antennas, and the angle distribution of incoming radio waves to a terminal apparatus is wide, and therefore, it is not practical to cause a terminal apparatus to transmit an uplink signal using a directional beam. Therefore, it is desirable to cause a base station to perform a beamforming process (e.g., multiplication by weight coefficients) on an uplink signal. However, when a base station performs an uplink beamforming process, a terminal apparatus may transmit an uplink signal using excessively high transmission power. As a result, the uplink signal is likely to interfere with other signals.

Also, for example, a downlink beamforming process may be performed on a cell-specific reference signal (CRS). In other words, a CRS may be transmitted using a directional beam. In this case, a terminal apparatus may calculate that the value of transmission loss (path loss) is small, and may transmit an uplink signal using low transmission power on the basis of the transmission loss. Therefore, the reception power of an uplink signal in a base station may be insufficient. In other words, a terminal apparatus may transmit an uplink signal using insufficient transmission power. As a result, uplink transmission quality may decrease.

With the above in mind, it is desirable to provide an arrangement capable of performing uplink transmission using appropriate transmission power in the case where a beamforming process is performed.

Solution to Problem

According to the present disclosure, there is provided a communication control apparatus including: an acquisition unit configured to acquire control information for determining uplink transmission power; and a communication control unit configured to control transmission of the control information to a terminal apparatus. The control information includes adjustment information for adjusting transmission power according to an antenna gain in a case where a beamforming process is performed.

According to the present disclosure, there is provided a communication control method including: acquiring control information for determining uplink transmission power; and controlling, by a processor, transmission of the control information to a terminal apparatus. The control information includes adjustment information for adjusting the transmission power according to an antenna gain in a case where a beamforming process is performed.

According to the present disclosure, there is provided a terminal apparatus including: an acquisition unit configured to acquire control information for determining uplink transmission power; and a communication control unit configured to control the uplink transmission power on the basis of the control information. The control information includes gain-related information about an antenna gain in a case where a beamforming process is performed.

According to the present disclosure, there is provided a communication control method including: acquiring control information for determining uplink transmission power; and controlling, by a processor, the uplink transmission power on the basis of the control information. The control information includes gain-related information about an antenna gain in a case where a beamforming process is performed.

According to the present disclosure, there is provided an information processing apparatus including: a memory configured to store a program; and one or more processors configured to be able to execute the program. The program executes acquiring control information for determining uplink transmission power, and controlling the uplink transmission power on the basis of the control information. The control information includes gain-related information about an antenna gain in a case where a beamforming process is performed.

Advantageous Effects of Invention

As described above, according to the present disclosure, uplink transmission can be performed using appropriate transmission power in the case where a beamforming process is performed.

BRIEF DESCRIPTION OF DRAWINGS

FIG. 3 is an illustrative diagram for describing an example of a codebook in which precoding matrices are specified.

DESCRIPTION OF EMBODIMENTS

Figure 1:
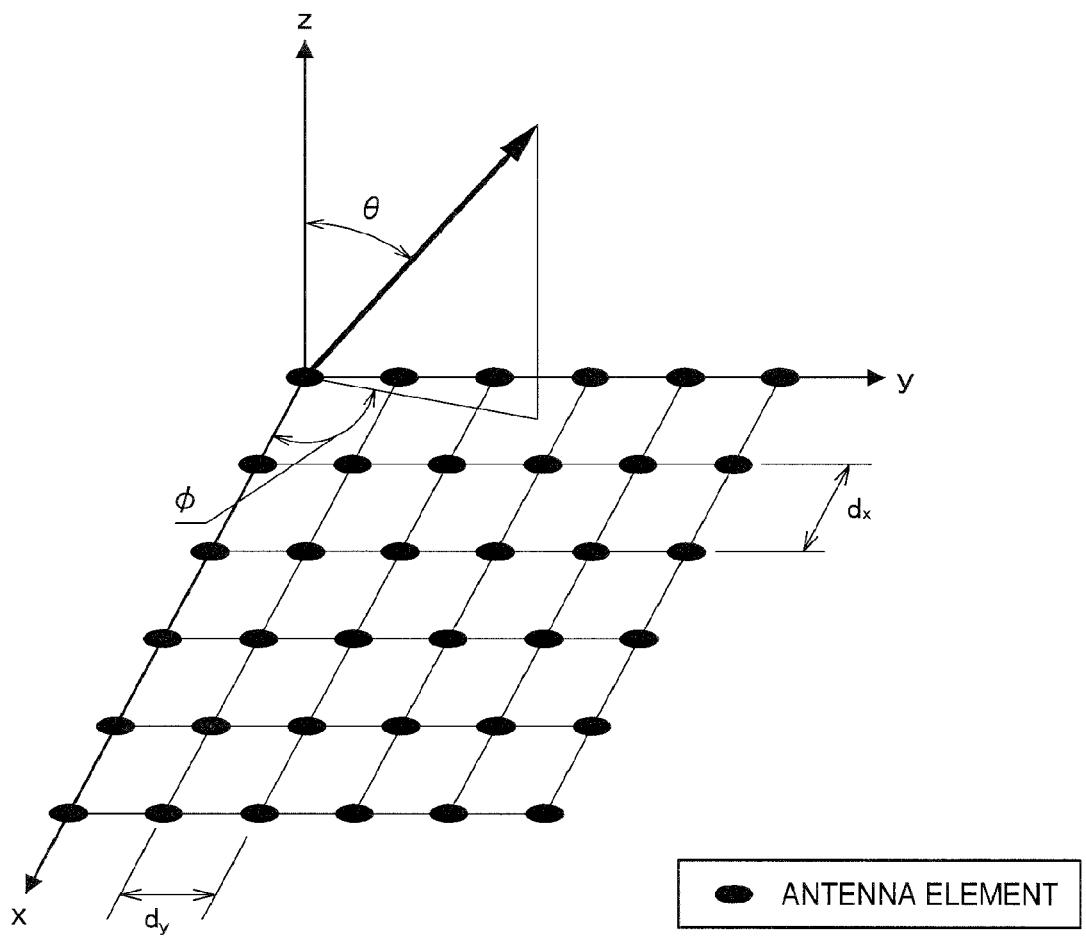
FIG. 1 is an illustrative diagram for describing a relationship between the position of each antenna element and the three-dimensional direction of a beam.

Hereinafter, (a) preferred embodiment(s) of the present disclosure will be described in detail with reference to the appended drawings. In this specification and the drawings, elements that have substantially the same function and structure are denoted with the same reference signs, and repeated explanation is omitted.

Also, in the present specification and the accompanying drawings, elements having substantially the same functional configuration may be distinguished from each other by different alphabetical letters added to the same reference sign. For example, a plurality of elements having substantially the same functional configuration are distinguished from each other when necessary, like terminal apparatuses 200A, 200B, and 200C. Note that when a plurality of elements having substantially the same functional configuration do not have to be particularly distinguished from each other, these elements are indicated only by the same reference sign. For example, when the terminal apparatuses 200A, 200B, and 200C do not have to be particularly distinguished from each other, these terminal apparatuses are simply referred to as terminal apparatuses 200.

Note that description will be provided in the following order.

1. Introduction
2. Schematic Configuration Of Communication System
3. First Embodiment
  3.1. Configuration Of Base Station
  3.2. Configuration Of Terminal Apparatus
  3.3. Specific Cases
    3.3.1. Case 1
    3.3.2. Case 2
    3.3.3. Case 3
  3.4. Flow Of Process
4. Second Embodiment
  4.1. Configuration Of Base Station
  4.2. Configuration Of Terminal Apparatus
  4.3. Specific Cases
    4.3.1. Case 1
    4.3.2. Case 2
    4.3.3. Case 3
  4.4. Flow Of Process
5. Application Examples
  5.1. Application Example Relating To Base Station
  5.2. Application Example Relating To Terminal Apparatus
6. Conclusion <<<1. Introduction>>>

Firstly, trends relating to beamforming, discussions relating to beamforming, problems relating to beamforming, and means according to embodiments of the present disclosure will be described with reference to FIG. 1 to FIG. 8.

(Trends Relating to Beamforming)

Given the recent widespread use of mobile data communication terminals, it is urgently necessary to address explosively increasing traffic. To this end, the Third Generation Partnership Project (3GPP) is studying techniques of increasing communication capacity, such as multi-user multiple-input and multiple-output (MU-MIMO), coordinated multipoint transmission/reception (CoMP), and the like.

LTE release 10 specifies that a base station is equipped with eight antennas. Therefore, the antennas can be used to achieve eight-layer multiple-input and multiple-output (MIMO) in the case of single-user MIMO (SU-MIMO). Eight-layer MIMO is a technique of spatially multiplexing eight separate streams. Also, four-user two-layer MU-MIMO can be achieved.

Terminal apparatuses have only a small space for accommodating antennas, and limited processing capability, and therefore, it is difficult to increase the number of antennas in a terminal apparatus. Meanwhile, recent advances in antenna mounting technology have made it possible to provide about 100 antennas in a base station.

It is expected that a base station thus equipped with about 100 antennas will have a narrower half-width (an angle at which the antenna gain is −3 dB) of a beam formed by the antennas. In other words, it is expected that it will be possible to form a sharp beam. Moreover, the arrangement of antenna elements on a plane will allow for formation of a beam aimed in a desired three-dimensional direction. It has been proposed that such a beam aimed in a three-dimensional direction is used to transmit a signal to a specific building located higher than a base station.

Also, the increase in the number of antennas allows for an increase in the number of MU-MIMO users. When the number of antennas of a terminal apparatus is two, the number of spatially separated streams is two for each terminal apparatus, and therefore, it is more reasonable to increase the number of MU-MIMO users than to increase the number of streams for each terminal apparatus. For the above various reasons, beamforming in downlink of LTE is expected to be advanced.

As the number of antennas increases, a sharper beam can be formed, and more sectors can be formed, and therefore, the number of users multiplexed per base station can be increased.

(Technique for Calculating Weight Coefficients for 3D Beamforming)

The weight coefficient of each antenna element for beamforming is represented by a complex number. This will be specifically described with reference to FIG. 1.

FIG. 1 is an illustrative diagram for describing a relationship between the position of each antenna element and the three-dimensional direction of a beam. Referring to FIG. 1, shown are antenna elements arranged in a grid pattern. Also, shown are two orthogonal axes x and y on a plane on which the antenna elements are placed, and an axis z perpendicular to the plane. Here, the direction of a beam to be formed is represented by, for example, an angle phi (Greek letter) and an angle theta (Greek letter). The angle phi (Greek letter) is an angle between the xy-plane component of the beam direction and the z-axis. Also, the angle theta (Greek letter) is an angle between the beam direction and the z-plane. In this case, for example, the weight coefficient $V_{m,n}$ of an antenna element that is m-th in the x-axis direction and n-th in the y-axis direction may be represented as follows.

$$V_{m,n}(\theta,\phi,f) = \exp(j2\pi f/c\{(m-1)d_x \sin(\theta)\cos(\phi) + (n-1)d_y \sin(\theta)\sin(\phi)\}) \quad \text{[Math. 1]}$$

In the above formula, f is a frequency, and c is the speed of light. Also, j is the imaginary unit of a complex number. Also, $d_x$ is an interval between each antenna element in the x-axis direction, and $d_y$ is an interval between each antenna element in the y-axis direction. Note that the coordinates of an antenna element are represented as follows.

$$x=(m-1)d_x, \ y=(n-1)d_y \quad \text{[Math. 2]}$$

After a desired three-dimensional direction has been determined, the weight coefficient of each antenna element can be obtained on the basis of the direction and the frequency f. Such weight coefficients are used as shown in, for example, FIG. 2.

Figure 2:
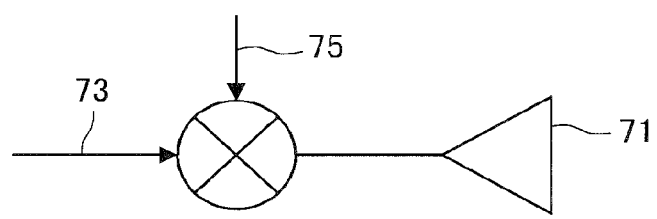
FIG. 2 is an illustrative diagram for describing an example of a technique of using weight coefficients for beamforming.

FIG. 2 is an illustrative diagram for describing an example of a technique of using weight coefficients for beamforming. Referring to FIG. 2, a transmission signal 73 corresponding to each antenna element 71 is complex-multiplied by the weight coefficient 75 of the antenna element 71. Thereafter, the transmission signal complex-multiplied by the weight coefficient 75 is transmitted from the antenna element 71. For example, the complex multiplication of the weight coefficient 75 is performed on a digital signal.

Although an example of the technique of calculating weight coefficients has been described, the weight coefficient calculation technique is not limited to this. Various calculation techniques may be applicable.

(Beamforming in LTE)

Beamforming in LTE is roughly divided into schemes in which precoding based on a codebook is used and schemes in which precoding not based on a codebook is used. Also, the schemes in which precoding based on a codebook is used include closed-loop techniques and open-loop techniques.

(Scheme in which Precoding Based on Codebook is Used)

A base station transmits a unique reference signal (e.g., a cell-specific reference signal (CRS)) from each of up to four antennas, for example. A terminal apparatus estimates channel characteristics by measuring CRSs corresponding to the number of transmission antennas of a base station, and calculates an optimum set of weight coefficients (precoding matrix) so that signal quality satisfies a predetermined condition. For example, a terminal apparatus calculates a precoding matrix so that the signal-to-interference-and-noise-power ratio (SINR) of a received signal is maximized.

In order to avoid an increase in overhead that occurs due to notification of an optimum precoding matrix itself, a terminal apparatus selects a precoding matrix closest to the optimum precoding matrix from candidate precoding matrices in a codebook, and notifies a base station of that precoding matrix. A specific example of a codebook will now be described with reference to FIG. 3.

FIG. 3 is an illustrative diagram for describing an example of a codebook in which precoding matrices are specified. Referring to FIG. 3, shown is a codebook containing four candidate precoding matrices where the number of layers is one, and four candidate precoding matrices where the number of layers is two. This codebook is specified in Table 6.3.4.2.3-1 of TS36.211 of the 3GPP. The number of rows and the number of columns in each matrix in a codebook are each based on the number of transmission antennas and the number of layers (the number of data streams). For example, a terminal apparatus determines an optimum candidate precoding matrix from the four candidate precoding matrices where the number of layers is one, and notifies a base station of the determined candidate precoding matrix as a recommended precoding matrix. The recommended precoding matrix is sent for notification by sending a codebook index corresponding to the recommended precoding matrix. For example, a base station transmits data toward a terminal apparatus using the received recommended precoding matrix (a closed-loop technique). Meanwhile, a base station, when not using the recommended precoding matrix, notifies a terminal apparatus of a codebook index corresponding to a precoding matrix to be used (an open-loop technique). Note that the recommended precoding matrix can be said to be a recommended set of weight coefficients. A codebook index may also be called a precoding matrix indicator (PMI).

Note that a codebook where the number of antennas is four is specified in Table 6.3.4.2.3-2 of TS36.211 of the 3GPP. Also, a codebook for CSI reporting with respect to a channel state information (CSI) reference signal, where the number of antennas is eight, is specified in Table 7.2.4-1 of TS36.213 of the 3GPP.

(Uplink Beamforming Process)

In a downlink beamforming process (i.e., a process for beamforming), a base station multiplies a downlink signal by weight coefficients for forming a directional beam. As a result, the downlink signal is radiated in the form of a directional beam into space. The weight coefficients are, for example, a recommended set of weight coefficients that are sent by a terminal apparatus.

Meanwhile, in an uplink beamforming process, a base station multiplies a received uplink signal by weight coefficients. As a result, also for the uplink signal, obtained is an effect similar to that for a downlink signal radiated in the form of a directional beam into space.

For example, when frequency division duplex (FDD) is employed, a frequency band for downlink is different from a frequency band for uplink, and therefore, weight coefficients for downlink cannot be applied to an uplink beamforming process. Therefore, when FDD is employed, it is additionally necessary to estimate uplink channel characteristics. For example, a terminal apparatus transmits a sounding reference signal in uplink. Thereafter, a base station estimates uplink channel characteristics on the basis of reception of the sounding reference signal, and calculates a set of weight coefficients on the basis of the channel characteristics. Thereafter, the set of weight coefficient is used in an uplink beamforming process.

Note that an uplink beamforming process has not been standardized and depends on the implementation. A terminal apparatus cannot determine whether an uplink beamforming process is performed.

(Size of Cell of Base Station)

The size of a service area of a base station (i.e., the size of a cell) in the background art is calculated from transmission loss characteristics in a frequency band used. Note that acceptable transmission loss is calculated from the necessary reception power of a terminal apparatus, the transmission power of a base station, the gain of a transmission/reception antenna, and the like.

A CRS transmitted by a base station in a downlink includes a signal sequence that is uniquely determined on the basis of a cell ID assigned to each base station. A terminal apparatus measures the intensity of a received CRS that is transmitted by a base station in a downlink, and if, for example, the reception intensity for a certain cell exceeds a predetermined intensity, sends a report to the base station. Thereafter, the base station decides to perform handover of the terminal apparatus to the certain cell, for example. In other words, the power of transmission of a CRS affects the size of a service area.

(Non-Directional Area)

For example, a base station that is located at the center of a cell and provides a service to the entire cell has a non-directional antenna. The non-directional antenna is an antenna that has no directivity on the horizontal plane and radiates radio waves uniformly in all directions. The size of a service area formed by a non-directional antenna is determined by the transmission power of a base station and transmission loss.

Also, for example, in an area where a large number of terminal apparatuses are present, such as an urban area, a base station is located at a position where three cells (also referred to as sectors) meet, instead of being located at the center of a cell. As a result, a single base station can provide a service to three cells. In such a case, the base station has a sector antenna for radiating radio waves to the three cells. The sector antenna is implemented by providing a metal reflector on a back surface of a dipole antenna. A specific example of a cell formed by a sector antenna will now be described with reference to FIG. 4.

Figure 4:
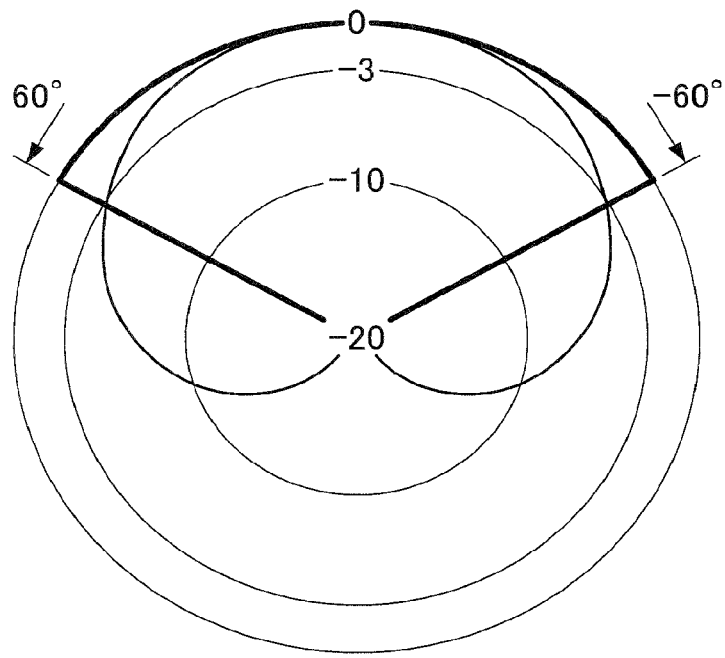
FIG. 4 is an illustrative diagram for describing an example of a cell formed by a sector antenna.

FIG. 4 is an illustrative diagram for describing an example of a cell formed by a sector antenna. Referring to FIG. 4, the beam width (−60 degrees to 60 degrees) of a sector antenna for forming three cells (sectors) is shown. The beam width is defined by a width at which the gain of an antenna is −3 dB. By aiming such a beam in three directions, three cells are formed. The sizes of the three formed cells are determined by the transmission power of a base station and transmission loss.

Note that a service area corresponding to radio waves generated without beamforming is herein referred to as a non-directional area. The radio waves may, for example, be non-directional radio waves radiated by a non-directional antenna or a sector beam radiated by a sector antenna. Alternatively, the radio waves may be radiated by a portion of a plurality of antenna elements possessed by a directional antenna. Note that the non-directional area can be said to be a service area the size of which is determined from transmission power and transmission loss.

(Directional Area)

A service area (communication region) corresponding to a sharp beam such as a three-dimensional beam (i.e., a beam aimed in a three-dimensional direction) is herein referred to as a "directional area." The intensity of radio waves in a non-directional area increases as one approaches the center of a cell, and decreases as one approaches the periphery of a cell. Meanwhile, the intensity of radio waves in a directional area is maintained relatively uniform.

(Transmission Power of Uplink Signal)

In TS36.213 of the 3GPP, transmission power $P_{PUSCH,c}(i)$ (dBm) used by a terminal apparatus for an uplink data channel in a sub-frame i, in a serving cell c, is defined as follows.

$$P_{PUSCH,c}(i) = \min\left\{ \begin{array}{l} P_{CMAX,c}(i), \\ 10\log_{10}(M_{PUSCH,c}(i)) + P_{O\_PUSCH,c}(j) + \\ \alpha_c(j) \cdot PL_c + \Delta_{TF,c}(i) + f_c(i) \end{array} \right\}$$ [Math. 3]

$P_{CMAX,\,c}(i)$ is the maximum transmission power of a terminal apparatus. $M_{PUSCH,\,c}(i)$ is a bandwidth that is determined on the basis of the number of resource blocks arranged in the frequency direction. $P_{O\_PUSCH,\,c}(j)$ is cell-specific desired reception power which is reported as a portion of system information. $PL_C$ is downlink transmission loss which is estimated from the transmission power of a CRS reported as a portion of system information and the reception power of a CRS measured by a terminal apparatus. $Alpha_C(j)$ (alpha is a Greek letter) is the coefficient of an estimated value of the transmission loss reported as a portion of system information. $f_c(i)$ is the accumulated value of adjusted power by a transmission power control (TPC) command sent by scheduling information or the like. $Delta_{TF,\,c}(i)$ (delta is a Greek letter) is the offset of the transmission power with respect to a desired SINR that is determined on the basis of the modulation scheme and the coding rate or the like.

The uplink transmission power is thus determined. For example, when a CRS is transmitted using a three-dimensional beam, the transmission power of the CRS affects the uplink transmission power of a terminal apparatus. Therefore, the transmission power of a CRS also affects interference caused by an uplink signal. In order to maximize the user capacity and the throughput or the like, it is necessary for a base station to appropriately determine the power of a CRS transmitted using a three-dimensional beam.

(Beam Width and Antenna Gain)

As a beam becomes sharper, the energy of radiated radio waves is concentrated, so that the gain increases. This will now be described in greater detail with reference to FIG. 5.

Figure 5:
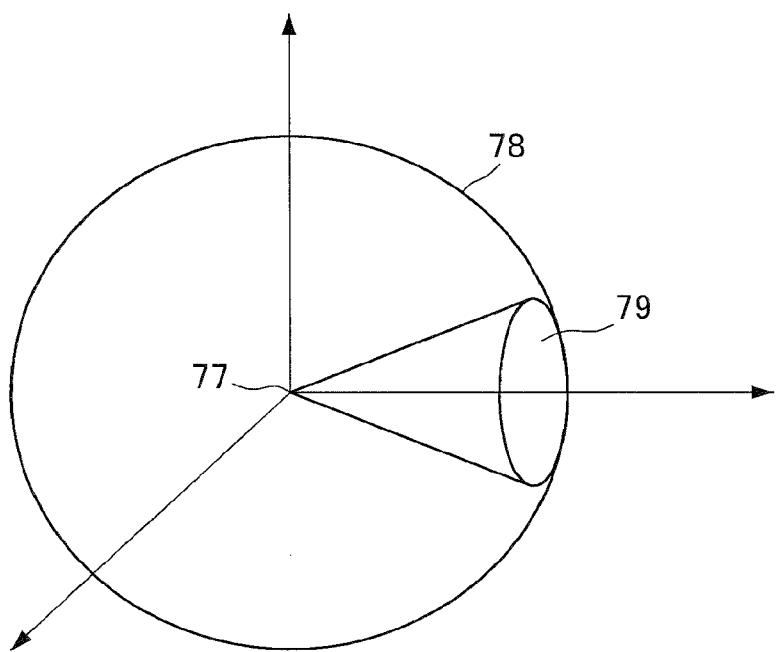
FIG. 5 is an illustrative diagram for describing an example of an improvement in gain by a beam.

FIG. 5 is an illustrative diagram for describing an example of gain improvement by a beam. Referring to FIG. 5, a position 77 where an antenna is provided is shown. For example, when a non-directional antenna is provided at the position 77, radio waves radiated by the non-directional antenna reach a spherical region 78. Meanwhile, when a directional antenna capable of forming a three-dimensional beam is provided at the position 77, radio waves having a radiation angle theta (Greek letter) that are radiated by the directional antenna (i.e., a three-dimensional beam having the radiation angle theta that is formed by the directional antenna) reach a region 79. Thus, as a beam becomes sharper, a region that is reached by radio waves becomes narrower, so that the energy of the radio waves is concentrated into a narrower region. As an example, when the antenna gain of a non-directional antenna for radiating radio waves that can reach the spherical region 78 is one, the antenna gain G of a directional antenna for forming a three-dimensional beam having the radiation angle theta is represented as follows.

$$G = \frac{2}{(1 - \cos\theta)} \qquad [\text{Math. 4}]$$

Note that as the number of antenna elements of a directional antenna increases, the directional antenna can form a sharper beam. In other words, as the number of antenna elements of a directional antenna increases, the peak of the gain of the directional antenna is improved. A specific example of this will now be described with reference to FIG. 6.

Figure 6:
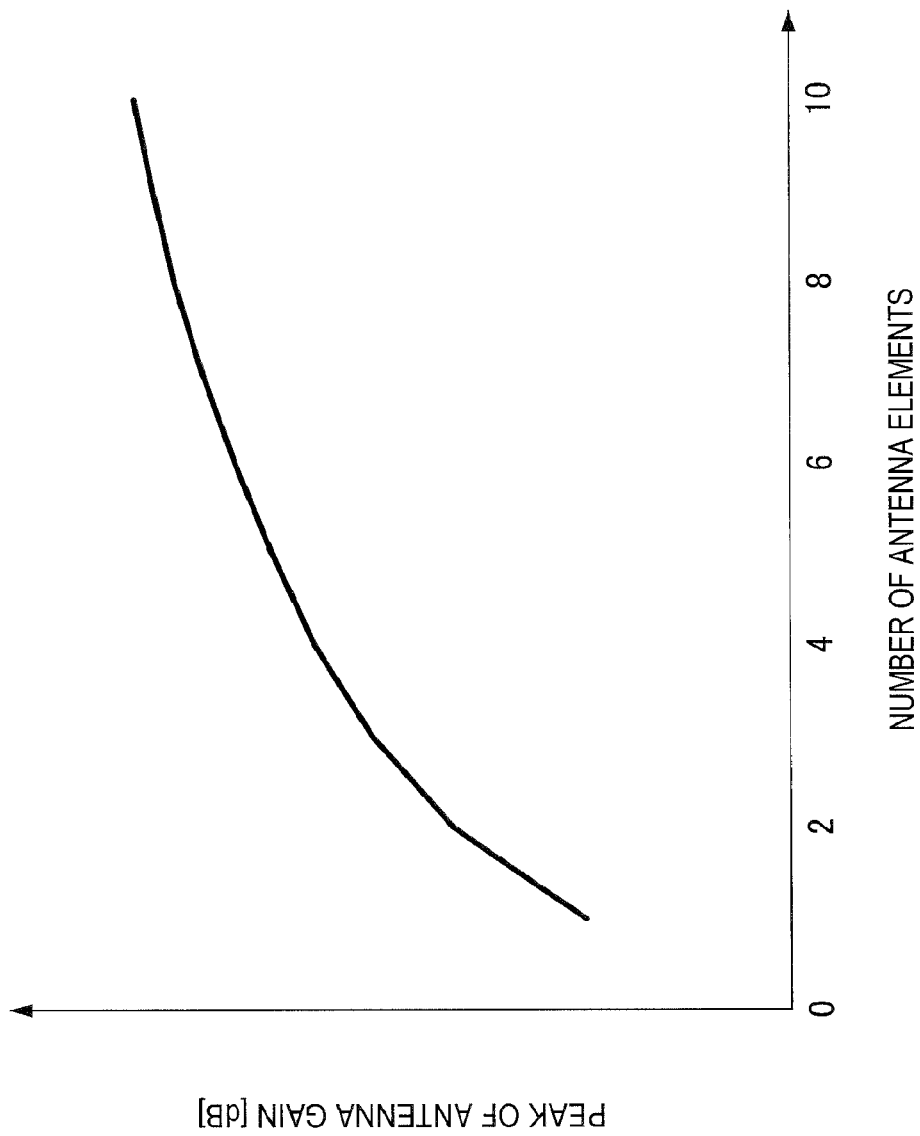
FIG. 6 is an illustrative diagram for describing an example of a relationship between the number of antenna elements and the peak of an antenna gain.

FIG. 6 is an illustrative diagram for describing an example of a relationship between the number of antenna elements and the peak of the antenna gain. Referring to FIG. 6, shown is a graph indicating the antenna gain with respect to the number of antenna elements. Thus, as the number of antenna elements increases, the peak of the antenna gain is improved.

(Formation of Virtual Cell Using Three-Dimensional Beam)

According to general beamforming, an increase in the number of antenna elements possessed by a base station may be accompanied by an increase in load involved in beamforming. As an example, an increase in the number of antenna elements is accompanied by an increase in the number of weight coefficients, which in turn increases a process for calculating the set of weight coefficients. In other words, load increases in terms of a process performed by a terminal apparatus or a base station. As another example, an increase in the number of antenna elements is accompanied by an increase in the size of a codebook, and therefore, it is necessary to allocate more radio resources for notification of a recommended set of weight coefficients, resulting in an increase in overhead. In other words, load increases in terms of radio resources.

It could be envisaged that, in order to reduce the increase in the load, an individual three-dimensional beam is assigned a cell ID so that a communication region corresponding to the three-dimensional beam (i.e., a region covered by the beam) is handled as a virtual cell. In this case, for example, it could be envisaged that a base station transmits a CRS for an individual three-dimensional beam using the individual three-dimensional beam. Moreover, for example, it could be envisaged that a base station transmits a synchronization signal, system information, or the like for the individual three-dimensional beam using the individual three-dimensional beam. The synchronization signal contains, for example, a primary synchronization signal (PSS) and a secondary synchronization signal (SSS). Also, the system information contains, for example, a master information block (MIB) and a system information block (SIB).

For example, a terminal apparatus, when entering a communication region (i.e., a virtual cell) corresponding to a three-dimensional beam, is synchronized using a synchronization signal transmitted using the three-dimensional beam, and acquires system information transmitted using the three-dimensional beam. Thereafter, the terminal apparatus measures a CRS transmitted using the three-dimensional beam, and if the measurement result satisfies a predetermined condition, sends a report on the measurement to a base station. Thereafter, for example, the base station performs handover of the terminal apparatus to the communication region (i.e., a virtual cell).

For example, a base station multiplies a downlink signal to a terminal apparatus belonging to a virtual cell corresponding to a three-dimensional beam by a weight coefficient, and transmits the downlink signal using the three-dimensional beam. Note that a base station may multiply an uplink signal from the terminal apparatus by a weight coefficient to perform an uplink beamforming process.

(Transmission of CRS)

A CRS is typically transmitted in each resource block. A specific example of transmission of a CRS in each resource block will now be described with reference to FIG. 7.

Figure 7:
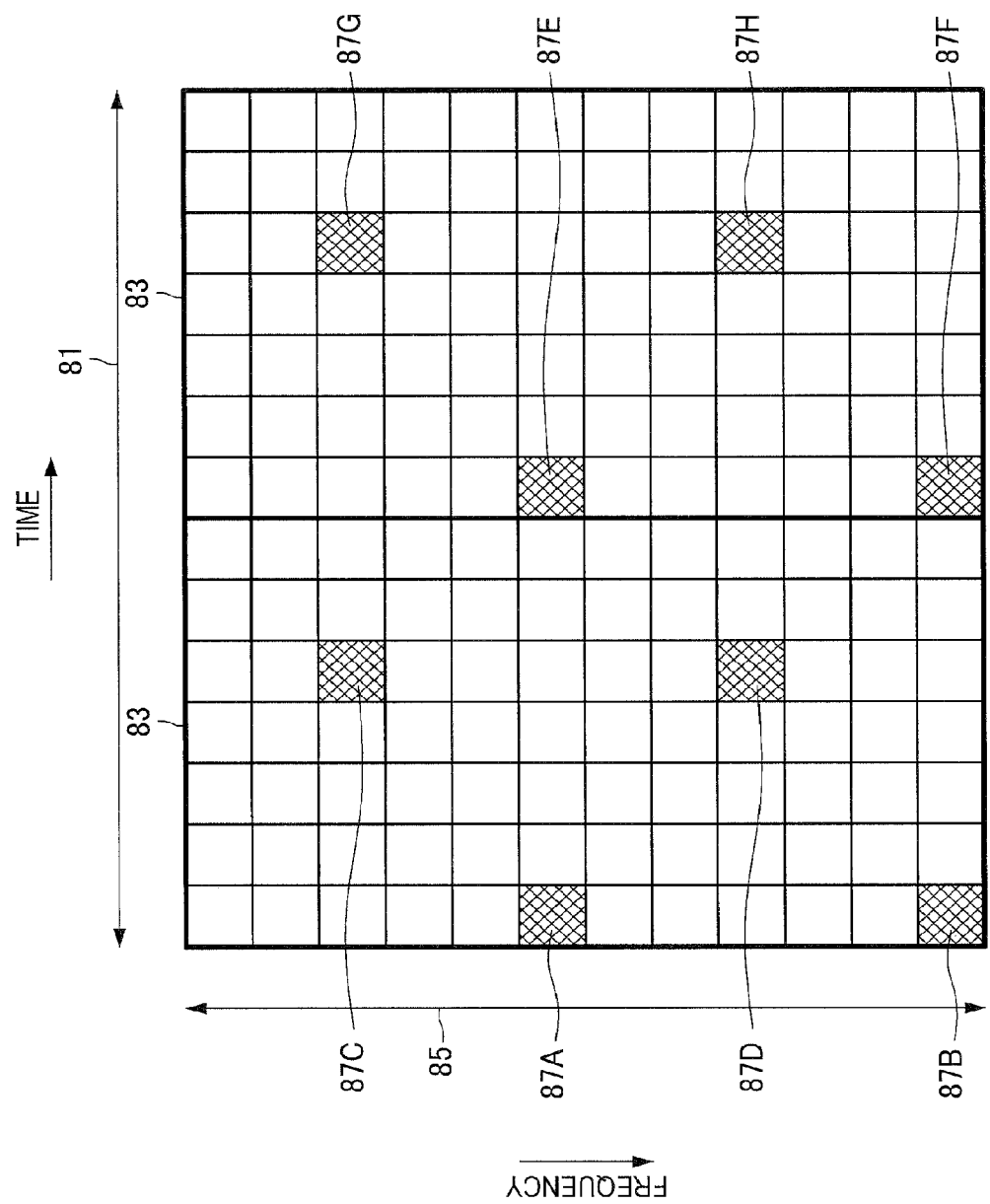
FIG. 7 is an illustrative diagram for describing an example of transmission of a CRS in each resource block.

FIG. 7 is an illustrative diagram for describing an example of transmission of a CRS in each resource block. Referring to FIG. 7, two resource blocks 83 arranged side by side in the time direction in a sub-frame 81 are shown. Each resource block 83 has a width of one slot (i.e., seven OFDM symbols) in the time direction. Also, each resource block 83 has a width 85 of 12 sub-carriers in the frequency direction. A radio resource having a width of one OFDM in the time direction and a width of one sub-carrier in the frequency direction is referred to as a resource element. Some resource elements contained in each resource block 83 are allocated for a CRS, and the CRS is transmitted using the allocated resource elements. Specifically, of resource elements corresponding to the first OFDM symbol in each resource block, two resource elements separated from each other by six sub-carriers are allocated for a CRS. Also, of resource elements corresponding to the third OFDM symbol in the resource block, two resource elements separated from each other by six sub-carriers are allocated for a CRS. In this example, a CRS is transmitted using resource elements 87A-87F.

Note that a CRS may be transmitted in a non-directional area or may be transmitted in a directional area.

(Problems with Beamforming)

When a beamforming process is performed, the level of the uplink transmission power may not be appropriate.

Case 1: Case where Uplink Beamforming Process is Performed in Base Station

For example, a terminal apparatus may transmit an uplink signal using a directional beam. However, a terminal apparatus cannot be equipped with a large number of antennas, and the angle distribution of incoming radio waves to a terminal apparatus is wide, and therefore, it is not practical to cause a terminal apparatus to transmit an uplink signal using a directional beam. Therefore, it is desirable to cause a base station to perform a beamforming process (e.g., multiplication by weight coefficients) on an uplink signal.

However, when an uplink beamforming process is performed in a base station, a terminal apparatus may transmit an uplink signal using excessively high transmission power. As a result, the uplink signal is likely to interfere with other signals.

Specifically, for example, of downlink signals, a data signal is transmitted using a directional beam, and a CRS is transmitted using radio waves generated without beamforming (e.g., non-directional radio waves radiated by a non-directional antenna, a sector beam radiated by a sector antenna, etc.). In this case, the reception power of a CRS in a terminal apparatus is lower than the reception power of a data signal in a terminal apparatus. As a result, a terminal apparatus obtains high transmission power as a result of calculation of the uplink transmission power on the basis of the reception power of a CRS, and transmits an uplink signal using the high transmission power. However, when a beamforming process is performed on an uplink signal in a base station, the reception power of the uplink signal in a base station becomes higher than necessary. Thus, a terminal apparatus may transmit an uplink signal using transmission power higher than necessary (i.e., excessively high transmission power). As a result, the uplink signal is likely to interfere with other signals. A specific example of this will now be described with reference to FIG. 8.

Figure 8:
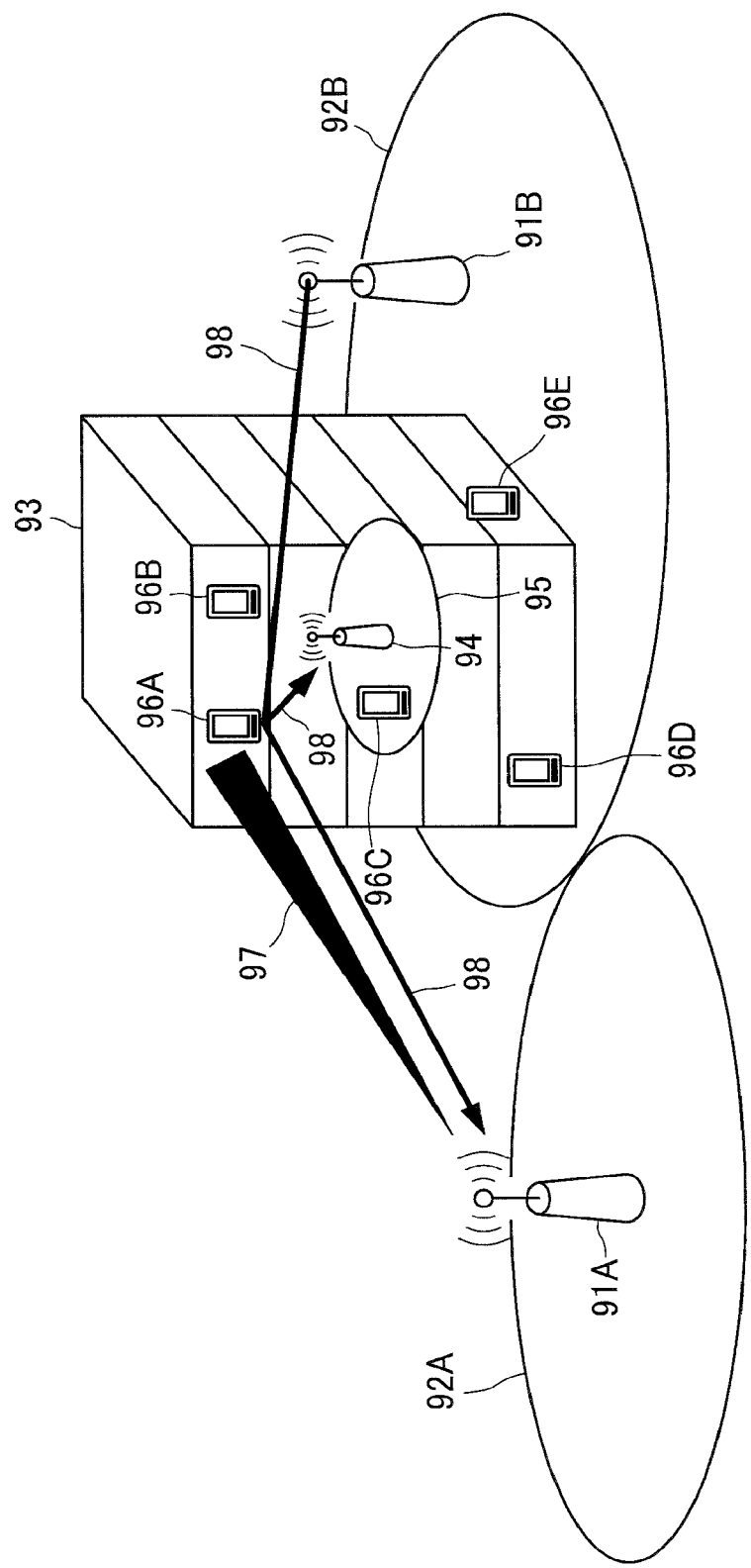
FIG. 8 is an illustrative diagram for describing an example of a case where an uplink signal is transmitted using excessively high transmission power.

FIG. 8 is an illustrative diagram for describing an example of a case where an uplink signal is transmitted using excessively high transmission power. Referring to FIG. 8, referring to FIG. 8, a base station 91A and a base station 91B that are adjacent to each other are shown. Also, a cell 92A of the base station 91A and a cell 92B of the base station 91B are shown. Moreover, a small base station 94 in a high-rise building 93 in the cell 92, and a small cell 95 in the small base station 94, are shown. The cell 92A and the cell 92B, and the small cell 95, are a non-directional area. Moreover, terminal apparatuses 96A-96E located in the high-rise building 93 in the cell 92B are shown. For example, the base station 91A transmits a data signal using a three-dimensional beam 97, and transmits a CRS using non-directional radio waves. In this case, the reception power of a CRS in the terminal apparatus 96A is low. As a result, a terminal apparatus obtains high transmission power as a result of calculation of the uplink transmission power on the basis of the reception power of a CRS, and transmits an uplink signal 98 using the high transmission power. The uplink signal 98 is transmitted using non-directional radio waves instead of a directional beam. As a result, the uplink signal 98 is likely to interfere with signals received by the base station 91B and the small base station 94 adjacent to the base station 91A and signals transmitted by any other terminal apparatuses 96.

For example, thus, in the case where an uplink beamforming process is performed in a base station, a terminal apparatus may transmit an uplink signal using excessively high transmission power. In particular, when a CRS is transmitted using radio waves generated without beamforming (e.g., non-directional radio waves radiated by a non-directional antenna, a sector beam radiated by a sector antenna, etc.), transmission using such excessively high transmission power is likely to occur.

Case 2: Case where Downlink Beamforming Process is Performed on CRS

For example, a downlink beamforming process may be performed on a CRS. In other words, a CRS may be transmitted using a directional beam. In this case, a terminal apparatus may calculate that the value of transmission loss is small, and may transmit an uplink signal using low transmission power on the basis of the transmission loss. Therefore, the reception power of an uplink signal in a base station is likely to be insufficient. In other words, a terminal apparatus may transmit an uplink signal using insufficient transmission power. As a result, uplink transmission quality may decrease.

Specifically, for example, of downlink signals, not only a data signal but also a CRS are transmitted using a directional beam. In this case, the difference between the transmission power of a CRS and the reception power of a CRS is smaller than when a CRS is transmitted using radio waves generated without beamforming. Therefore, a terminal apparatus calculates that the value of the transmission loss is small. As a result, it is calculated that the value of the uplink transmission power is small. In other words, a terminal apparatus transmits an uplink signal using low transmission power. In particular, when an uplink beamforming process is not performed in a base station, uplink reception power may be insufficient in the base station. In other words, a terminal apparatus may transmit an uplink signal using insufficient transmission power. As a result, uplink transmission quality may decrease.

For example, thus, in the case where a CRS is transmitted using a directional beam, a terminal apparatus may transmit an uplink signal using insufficient transmission power. In particular, when a uplink beamforming process is not performed in a base station, such transmission using insufficient transmission power is highly likely to occur.

Case 3: Case which is Combination of Case 1 and Case 2

For example, an uplink beamforming process is performed in a base station, and a downlink beamforming process is performed on a CRS. In this case, a terminal apparatus may calculate that the value of the transmission loss is small, and may transmit an uplink signal using low transmission power on the basis of the transmission loss. As a result, however, an uplink beamforming process in a base station may provide sufficient uplink reception power. Thus, an uplink beamforming process may lead to avoidance of insufficient uplink transmission power which would be caused due to a downlink beamforming process on a CRS. Alternatively, a downlink beamforming process on a CRS may lead to avoidance of excessively high uplink transmission power which would be caused due to an uplink beamforming process.

However, for example, a symmetrical relationship is not necessarily established between a downlink beamforming process and an uplink beamforming process. As an example, there may be a difference in the number of corresponding antenna elements between a downlink beamforming process and an uplink beamforming process. For example, in such a case, the uplink transmission power may be excessively high. Alternatively, the uplink transmission power may be insufficient.

Various cases described above are, for example, summarized as follows.

TABLE 1

| | | Uplink beamforming process | |
|---|---|---|---|
| | | No | Yes |
| Downlink beamforming process on CRS | No | | <Case 1> Excessively high uplink transmission power |
| | Yes | <Case 2> Insufficient uplink transmission power | <Case 3> Excessively high or insufficient uplink transmission power |

Use of Closed-Loop Power Control

As described above, in the open-loop power control, the uplink transmission power may be excessively high or insufficient. Therefore, in order to cause the uplink reception power in a base station to be desired reception power, the closed-loop power control is performed in which a base station transmits a transmission power control (TPC) command to a terminal apparatus, and the terminal apparatus adjusts the transmission power according to the TPC command.

However, until such a closed-loop power control causes the uplink transmission power to converge to appropriate transmission power, the transmission power may be excessively high power or insufficient. Therefore, until the uplink transmission power converges to appropriate transmission power, the uplink signal may interfere with other signals, or uplink transmission quality may decrease.

Therefore, embodiments of the present disclosure allow for uplink transmission using appropriate transmission power in the case where a beamforming process is performed.

(Means According to Embodiments of Present Disclosure)

Causes of Excessively High Transmission Power and Insufficient Transmission Power A cause of excessively high or insufficient transmission power obtained as a result of calculation of the uplink transmission power is that the downlink transmission antenna gain and the uplink reception antenna gain are not taken into consideration in the uplink transmission power calculation formula. Specifically, for example, the possible presence of a difference between the downlink transmission antenna gain and the uplink reception antenna gain is not taken into consideration.

For example, when an uplink beamforming process is performed as in the above case 1, the uplink reception antenna gain is high. However, in the calculation of the uplink transmission power, the desired reception power of an uplink signal in a base station is only taken into consideration, and the uplink reception antenna gain is not taken into consideration. Therefore, the uplink transmission power may be excessively high.

Also, for example, as in the above case 2, when a downlink beamforming process is performed, the downlink transmission antenna gain is high. However, even if a beamforming process is performed on a CRS, the transmission power of the CRS is only taken into consideration, and the downlink transmission antenna gain is not taken into consideration, in the calculation of the uplink transmission power. Therefore, the transmission loss may be underestimated, so that the uplink transmission power may be insufficient.

Moreover, for example, as in the above case 3, an uplink beamforming process may be performed, and a downlink beamforming process may be performed on a CRS. As a result, both the uplink reception antenna gain and the downlink transmission antenna gain are high. However, although there may be the difference between the uplink reception antenna gain and the downlink transmission antenna gain, the difference is not taken into consideration in the calculation of the uplink transmission power. Therefore, the uplink transmission power may be excessively high or insufficient.

Means for Obtaining Appropriate Transmission Power

In an embodiment of the present disclosure, adjustment information for adjusting the uplink transmission power according to the antenna gain in the case where a beamforming process is performed, is transmitted by a base station to a terminal apparatus. As a result, for example, uplink transmission can be performed using appropriate transmission power in the case where a beamforming process is performed.

<<<2. Schematic Configuration Of Communication System>>>

Figure 9:
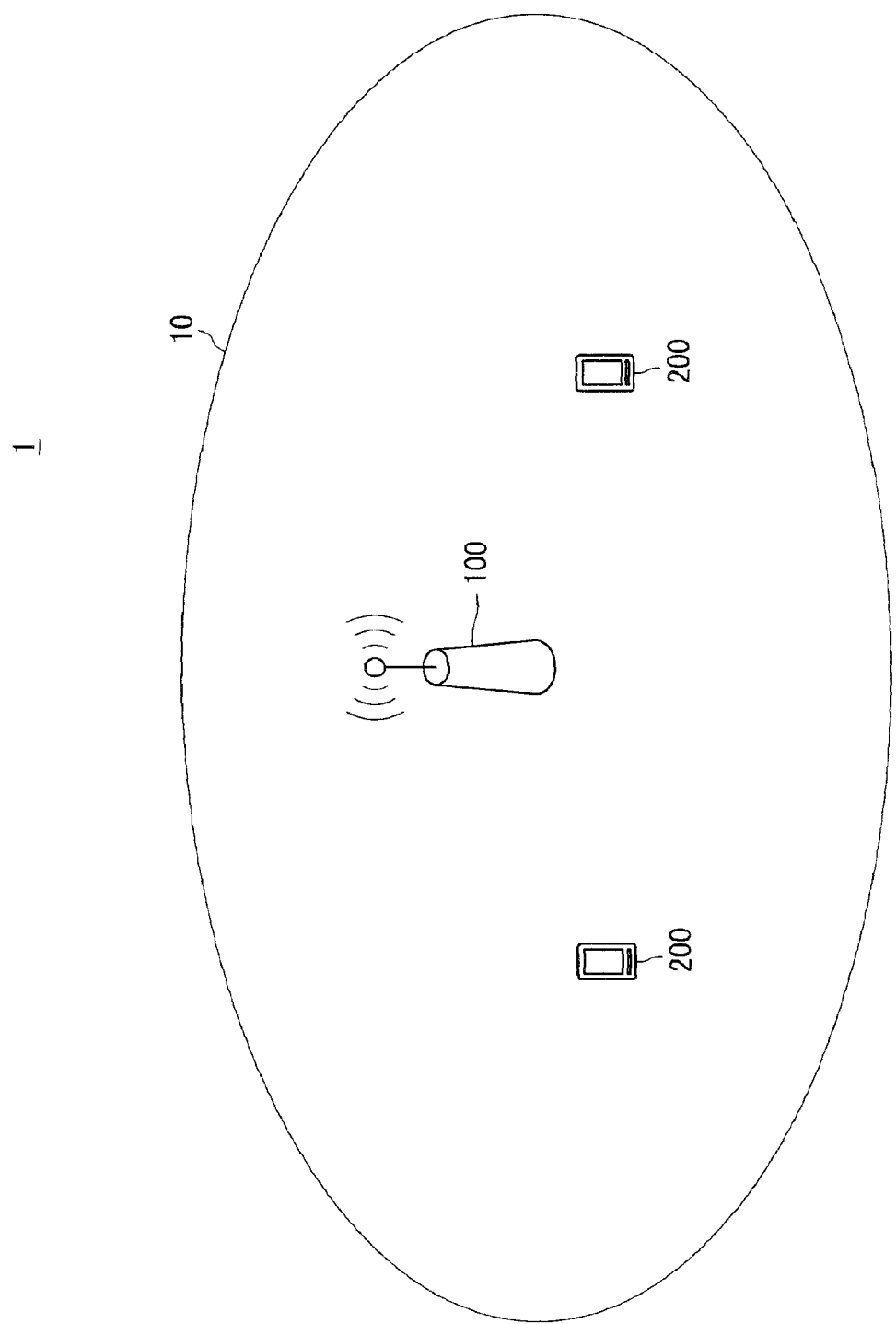
FIG. 9 is an illustrative diagram showing an example of a schematic configuration of a communication system according to an embodiment of the present disclosure.

Next, a schematic configuration of a communication system 1 according to an embodiment of the present disclosure will be described with reference to FIG. 9 to FIG. 11. FIG. 9 is an illustrative diagram showing an example of a schematic configuration of the communication system 1 according to an embodiment of the present disclosure. Referring to FIG. 9, the communication system 1 includes a base station 100 and terminal apparatuses 200. The communication system 1 complies with, for example, LTE, LTE-Advanced, or other similar communication schemes.

The base station 100 performs radio communication with terminal apparatuses 200. For example, the base station 100 transmits a downlink signal to a terminal apparatus 200, and the terminal apparatus 200 receives the downlink signal. Also, a terminal apparatus 200 transmits an uplink signal to the base station 100, and the base station 100 receives the uplink signal.

Transmission of Signal to Directional Area

For example, the base station 100, which includes a directional antenna capable of forming a directional beam, transmits a down signal using a directional beam. The directional beam is, for example, a three-dimensional beam (i.e., a beam aimed in a three-dimensional direction). The above directional antenna is capable of forming a three-dimensional beam. In other words, the base station 100 transmits a downlink signal using a three-dimensional beam. In a specific process, for example, the base station 100 multiplies a downlink signal by a weight coefficient for each antenna element of a directional antenna. As a result, the downlink signal is transmitted using a three-dimensional beam. Thereafter, a terminal apparatus 200 receives the downlink signal transmitted using a three-dimensional beam. An example of a three-dimensional beam formed by the base station 100, and an example of transmission and reception of a downlink signal using a three-dimensional beam, will now be described with reference to FIG. 10 and FIG. 11.

Figure 10:
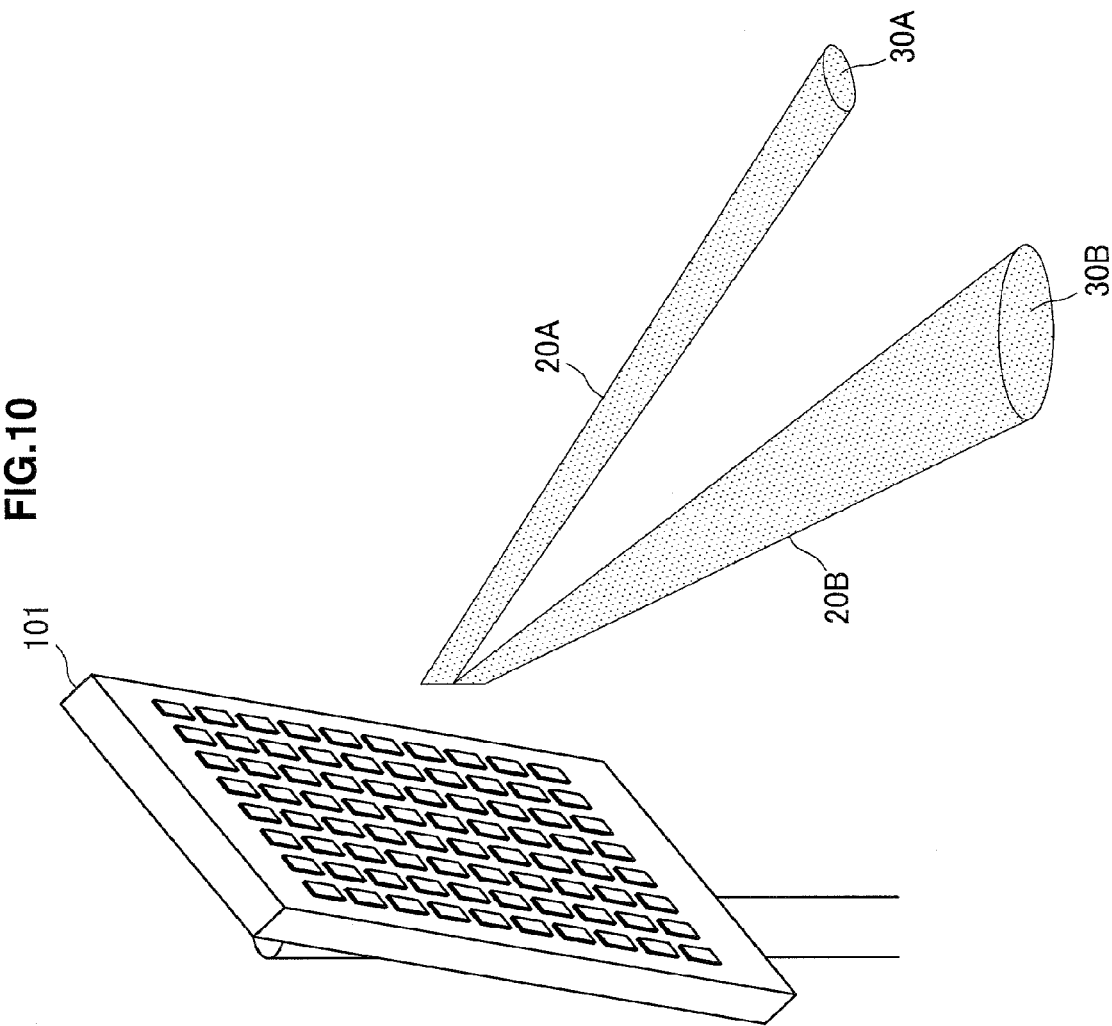
FIG. 10 is an illustrative diagram for describing an example of a three-dimensional beam formed by a base station.

FIG. 10 is an illustrative diagram for describing an example of a three-dimensional beam formed by the base station 100. Referring to FIG. 10, a directional antenna 101 is shown. The directional antenna 101 is capable of forming a three-dimensional beam. As shown in FIG. 10, the directional antenna 101 forms a plurality of three-dimensional beams 20 aimed in different three-dimensional directions. For example, thus, the directional antenna 101 is provided at a high position, and the three-dimensional beams 20 are radiated in any direction (downward, upward, or horizontal direction). As a result, communication regions 30 corresponding to the respective three-dimensional beams 20 are generated. Specifically, a three-dimensional beam 20A is formed, and a communication region 30A corresponding to the three-dimensional beam 20A is generated. Also, a three-dimensional beam 20B is formed, and a communication region 30B corresponding to the three-dimensional beam 20B is generated.

Figure 11:
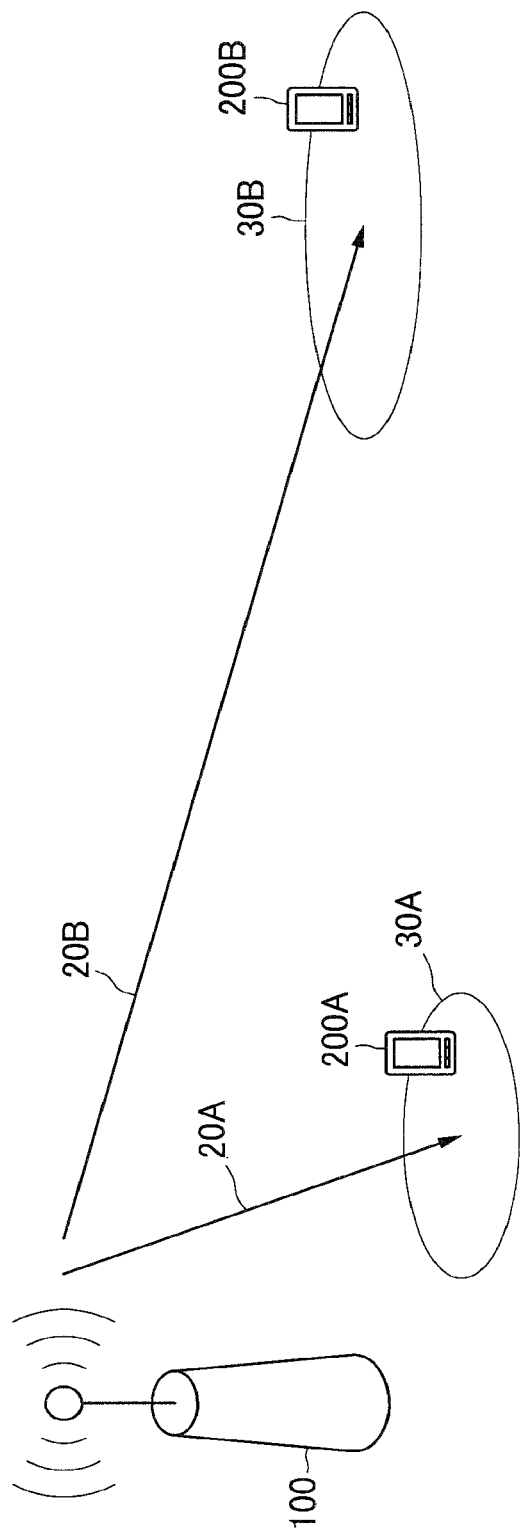
FIG. 11 is an illustrative diagram for describing an example of transmission and reception of a downlink signal using a three-dimensional beam.

FIG. 11 is an illustrative diagram for describing an example of transmission and reception of a downlink signal using a three-dimensional beam. Referring to FIG. 11, a base station 100, and a terminal apparatus 200A and a terminal apparatus 200B, are shown. Moreover, shown are a three-dimensional beam 20A formed by the base station 100 and a corresponding communication region 30A, and a three-dimensional beam 20B formed by the base station 100 and a corresponding communication region 30B. The three-dimensional beam 20A carries a downlink signal to the communication region 30A. In other words, the terminal apparatus 200A can receive, in the communication region 30A, a downlink signal that is transmitted by the base station 100 using the three-dimensional beam 20A. Also, the three-dimensional beam 20B carries a downlink signal to the communication region 30B. In other words, the terminal apparatus 200B can receive, in the communication region 30B, a downlink signal that is transmitted by the base station 100 using the three-dimensional beam 20B. Note that the signal intensity of a downlink signal transmitted using the three-dimensional beam 20A is high in the communication region 30A, and is negligibly low in the communication region 30B. Also, the signal intensity of a downlink signal transmitted using the three-dimensional beam 20B is high in the communication region 30B, and is negligibly low in the communication region 30A.

Note that the base station 100 can use the same radio resources (e.g., the same resource block) to transmit a signal using the three-dimensional beam 20A and the three-dimensional beam 20B. This is because the three-dimensional beam 20A does not substantially reach the communication region 30B which is reached by the three-dimensional beam 20B, and the three-dimensional beam 20B does not substantially reach the communication region 30A which is reached by the three-dimensional beam 20A. Thus, users can be multiplexed using directional (e.g. three-dimensional) beams.

Transmission of Signal to Non-Directional Area

For example, the base station 100 also transmits a downlink signal using radio waves generated without beamforming. In other words, the base station 100 provides a service in a non-directional area (cell 10) in addition to a directional area. The above radio waves may be non-directional radio waves radiated by a non-directional antenna or a sector beam radiated by a sector antenna. Alternatively, the above radio waves may be radiated by a directional antenna without a beamforming process, for example, using a portion of a plurality of antenna elements possessed by a directional antenna.

Also, a frequency band for a non-directional area and a frequency band for a directional area may be the same frequency band (e.g., the same component carrier), or may be different frequency bands (different component carriers). Also, synchronization in the frequency direction (frequency synchronization) and synchronization in the time direction (timing synchronization) may be maintained between radio communication in a non-directional area (i.e., the cell 10) and radio communication in a directional area (i.e., the communication region 30).

<<<3. First Embodiment>>>

Next, a first embodiment of the present disclosure will be described with reference to FIG. 12 to FIG. 15.

As described above, in an embodiment of the present disclosure, adjustment information for adjusting the uplink transmission power according to the antenna gain in the case where a beamforming process is performed, is transmitted by a base station 100 to a terminal apparatus 200. In particular, in a first embodiment, as the adjustment information, gain-related information about the antenna gain in the case where a beamforming process is performed is transmitted by the base station 100 to a terminal apparatus 200.

<<3.1. Configuration of Base Station>>

Figure 12:
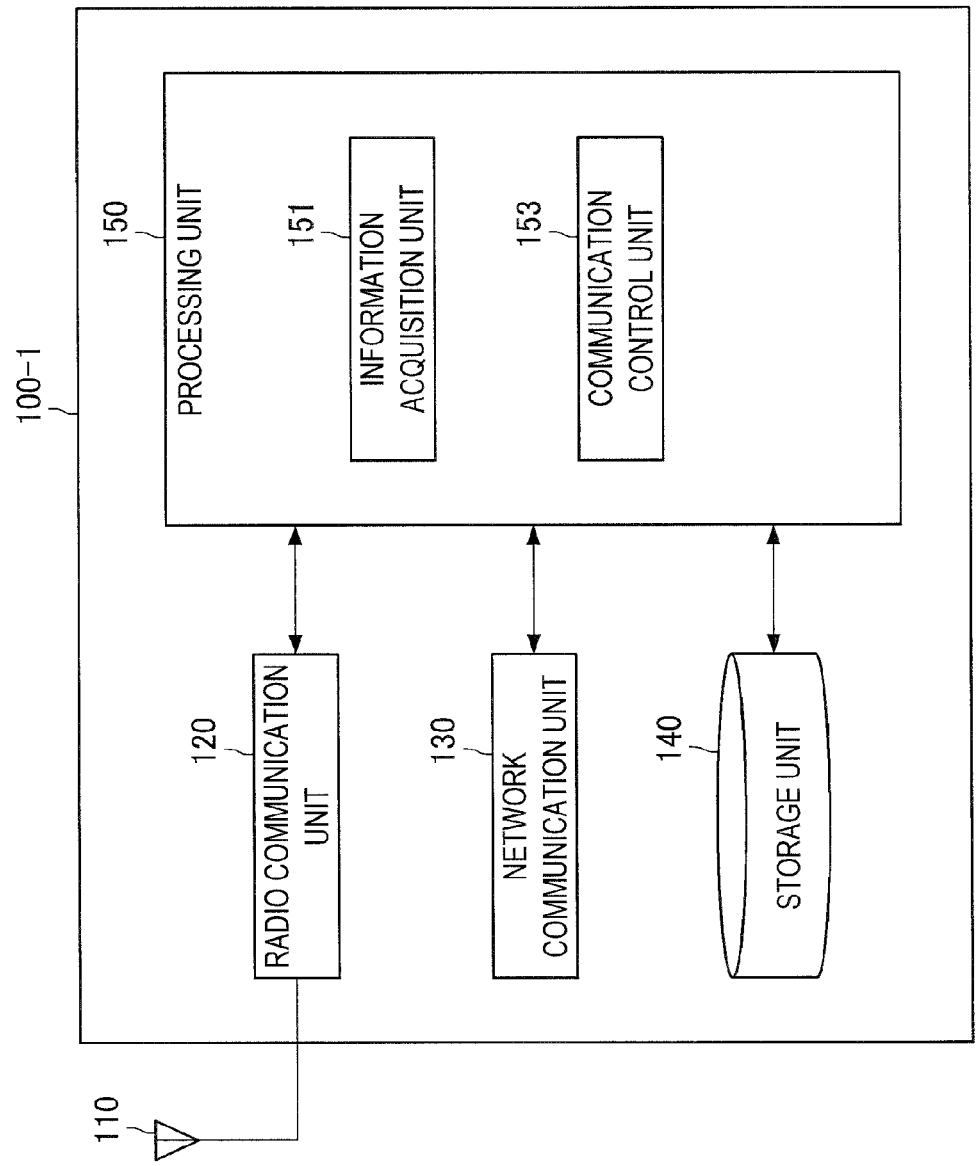
FIG. 12 is a block diagram showing an example of a configuration of a base station according to a first embodiment.

Firstly, an example of a configuration of a base station 100-1 according to the first embodiment will be described with reference to FIG. 12. FIG. 12 is a block diagram showing an example of a configuration of the base station 100-1 according to the first embodiment. Referring to FIG. 12, the base station 100-1 includes an antenna unit 110, a radio communication unit 120, a network communication unit 130, a storage unit 140, and a processing unit 150.

(Network Communication Unit 130)

The network communication unit 130 communicates with other communication nodes. For example, the network communication unit 130 communicates with another base station 100 or a core network node.

In particular, in an embodiment of the present disclosure, the antenna unit 110 forms a directional beam, and transmits a signal using the directional beam. For example, the antenna unit 110 forms a plurality of directional beams aimed in different directions. As an example, the antenna unit 110 forms a three-dimensional beam (i.e., a beam aimed in a three-dimensional direction), and transmits a signal using the three-dimensional beam. For example, the antenna unit 110 forms a plurality of three-dimensional beams aimed in different three-dimensional directions.

The direction of a directional beam (e.g., the three-dimensional direction of a three-dimensional beam) formed by the antenna unit 110 is determined on the basis of a set of weight coefficients corresponding to the antenna elements. For example, multiplication of a signal by a weight coefficient for each antenna element is performed by the processing unit 150. As a result, the antenna unit 110 forms a directional beam aimed in a direction determined on the basis of the weight coefficients (e.g., a three-dimensional beam aimed in a three-dimensional direction determined on the basis of the weight coefficients).

Note that, moreover, the antenna unit 110 can radiate radio waves generated without beamforming. For example, the antenna unit 110 may radiate non-directional radio waves using a non-directional antenna, or may radiate a sector beam using a sector antenna. Alternatively, the antenna unit 110 may radiate radio waves generated without beamforming using a portion of a plurality of antenna elements possessed by a directional antenna.

The antenna unit 110 includes, for example, a directional antenna 101. The antenna unit 110 may further include a non-directional antenna or a sector antenna.

(Radio Communication Unit 120)

The radio communication unit 120 performs radio communication. For example, the radio communication unit 120 transmits a downlink signal to a terminal apparatus 200, and receives an uplink signal from a terminal apparatus 200.

(Network Communication Unit 130)

The network communication unit 130 communicates with other communication nodes. For example, the network communication unit 130 communicates with a core network node or another base station 100.

(Storage Unit 140)

The storage unit 140 stores a program and data for operation of the base station 100.

(Processing Unit 150)

The processing unit 150 provides various functions of the base station 100-1. The processing unit 150 includes an information acquisition unit 151 and a communication control unit 153.

(Information Acquisition Unit 151)

The information acquisition unit 151 acquires control information for determining the uplink transmission power. In an embodiment of the present disclosure, the control information includes adjustment information for adjusting the transmission power according to the antenna gain in the case where a beamforming process is performed.

Gain-Related Information

In particular, in the first embodiment, the control information includes, as the above adjustment information, gain-related information about the antenna gain in the case where a beamforming process is performed.

Note that the above gain-related information includes information differing between the above case 1, case 2, and case 3 relating to beamforming.

Parameters

For example, the above control information includes one or more parameters for calculating the uplink transmission power. Specifically, for example, the one or more parameters include the desired reception power of an uplink signal and the transmission power of a CRS. Moreover, the above one or more parameters include, for example, the coefficient of an estimated value of the transmission loss.

(Communication Control Unit 153)

The communication control unit 153 controls radio communication of the base station 100-1.

Control of Transmission of Control Information

In particular, in an embodiment of the present disclosure, the communication control unit 153 controls transmission of the above control information to a terminal apparatus 200-1. In other words, the base station 100-1 transmits the above control information to the terminal apparatus 200-1 under the control of the communication control unit 153.

Gain-Related Information

As described above, in particular, in the first embodiment, the above control information includes gain-related information about the antenna gain in the case where a beamforming process is performed. The communication control unit 153 controls transmission of the gain-related information.

For example, the communication control unit 153 controls transmission of the above gain-related information to the terminal apparatus 200-1 so that the above gain-related information is transmitted as a portion of system information using a directional beam. In other words, the base station 100-1 transmits the above gain-related information as a portion of system information to the terminal apparatus 200-1 using a directional beam under the control of the communication control unit 153. In other words, the above gain-related information is transmitted to a directional area. Also, the above gain-related information is, for example, contained in any system information block (SIB) of the above system information.

In a specific process, for example, the communication control unit 153 maps a signal of the above gain-related information to radio resources allocated to an SIB containing the gain-related information. Thereafter, the communication control unit 153 multiplies the above mapped signal by weight coefficients for forming a directional beam. As a result, the above gain-related information is transmitted as a portion of the STB using a directional beam. Note that the above SIB may be entirely transmitted using a directional beam, or only a portion of the above SIB containing the above gain-related information may be transmitted using a directional beam, and the remainder of the above SIB may be transmitted using radio waves generated without beamforming.

Such transmission of the above gain-related information using a directional beam allows for, for example, transmission of different pieces of gain-related information using different directional beams. Therefore, even when different antenna gains are used for different directional beams, appropriate gain-related information corresponding to the directional beam can be reported to the terminal apparatus 200-1.

Note that the above gain-related information may be transmitted using radio waves generated without beamforming instead of a directional beam. In other words, the above gain-related information may be transmitted to a non-directional area. In this case, the above gain-related information may be transmitted as a portion of system information, or may be transmitted by separate signaling. The communication control unit 153 may thus control transmission of the above gain-related information to the terminal apparatus 200-1. For example, when the same transmission antenna gain is used for all directional beams formed by a directional antenna, the above gain-related information may be thus transmitted using radio waves generated without beamforming. As a result, the process for transmitting the gain-related information can be reduced.

Parameters

As described above, for example, the above control information includes the above one or more parameters for calculating the uplink transmission power (e.g., the desired reception power of an uplink signal, the transmission power of a CRS, and the coefficient of an estimated value of the transmission loss). The communication control unit 153 controls transmission of the above one or more parameters.

For example, the above one or more parameters are also transmitted as a portion of system information using a directional beam. In this case, for example, the above gain-related information and the above one or more parameters may be contained in the same SIB, or may be contained in different SIBS.

Note that the above one or more parameters may be transmitted using radio waves generated without beamforming instead of being transmitted using a directional beam. In other words, the above one or more parameters may be transmitted to a non-directional area. The communication control unit 153 may thus control transmission of the above one or more parameters to the terminal apparatus 200-1.

<<3.2 Configuration of Terminal Apparatus>>

Figure 13:
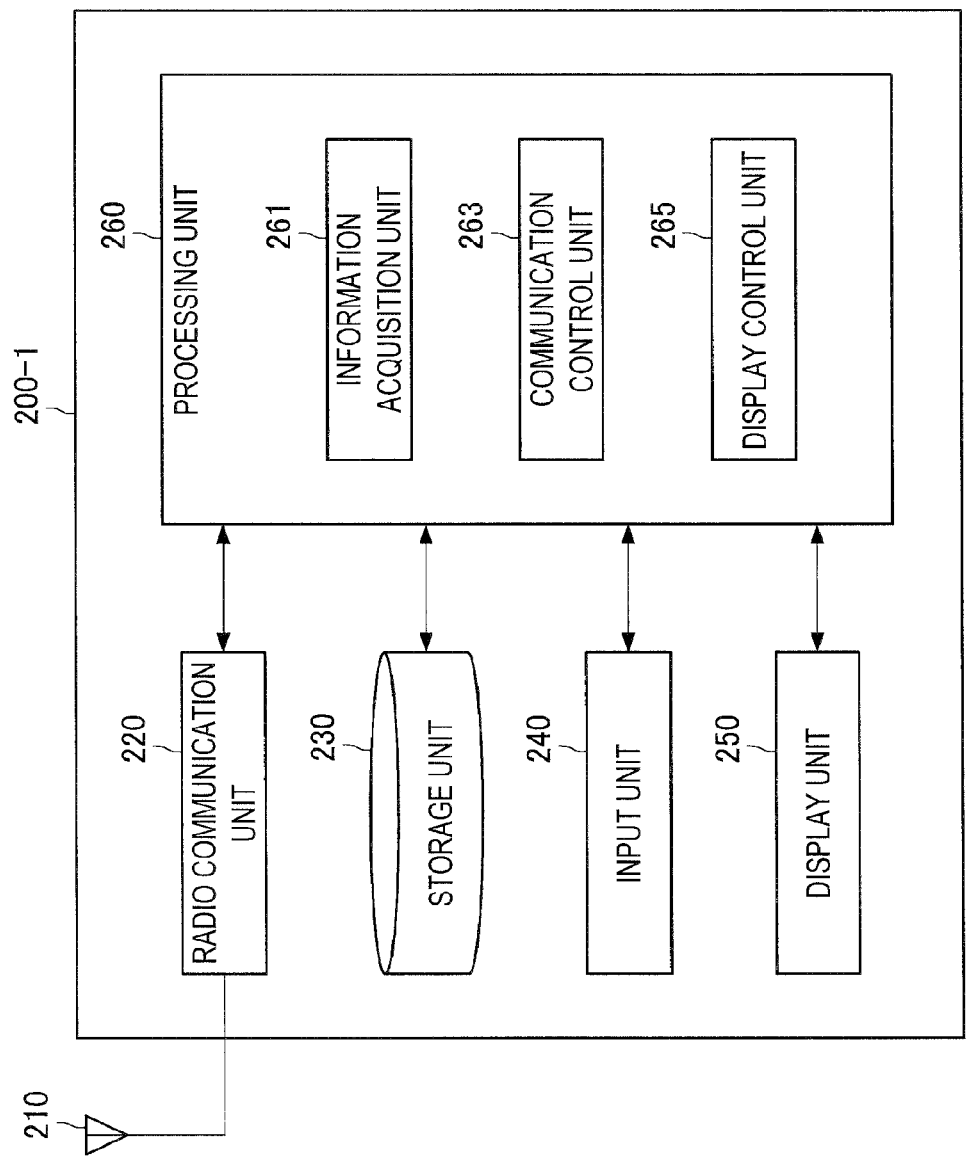
FIG. 13 is a block diagram showing an example of a configuration of a terminal apparatus according to the first embodiment.

Next, an example of a configuration of the terminal apparatus 200-1 according to the first embodiment will be described with reference to FIG. 13. FIG. 13 is a block diagram showing an example of a configuration of the terminal apparatus 200-1 according to the first embodiment. Referring to FIG. 13, the terminal apparatus 200-1 includes an antenna unit 210, a radio communication unit 220, a storage unit 230, an input unit 240, a display unit 250, and a processing unit 260.

(Antenna Unit 210)

The antenna unit 210 radiates a signal output by the radio communication unit 220, in the form of radio waves, into space. The antenna unit 210 also converts radio waves in space into a signal, and outputs the signal to the radio communication unit 220.

(Radio Communication Unit 220)

The radio communication unit 220 performs radio communication. For example, the radio communication unit 220 receives a downlink signal from the base station 100, and transmits an uplink signal to the base station 100.

(Storage Unit 230)

The storage unit 230 stores a program and data for operation of the terminal apparatus 200.

(Input Unit 240)

The input unit 240 receives an input entered by the user of the terminal apparatus 200. The input unit 240 provides the input result to the processing unit 260.

(Display Unit 250)

The display unit 250 displays a screen that is presented to the user of the terminal apparatus 200. For example, the display unit 250 displays the screen by the control of the processing unit 260 (display control unit 265).

(Processing Unit 260)

The processing unit 260 provides various functions of a terminal apparatus 200. The processing unit 260 includes an information acquisition unit 261, a communication control unit 263, and a display control unit 265.

(Information Acquisition Unit 261)

The information acquisition unit 261 acquires control information for determining the uplink transmission power. For example, when the base station 100-1 transmits the above control information, the information acquisition unit 261 acquires the control information.

Gain-Related Information

As described above, in an embodiment of the present disclosure, the above control information includes adjustment information for adjusting the transmission power according to the antenna gain in the case where a beamforming process is performed. Also, as described above, in particular, in the first embodiment, the above control information includes, as the above adjustment information, gain-related information about the antenna gain in the case where a beamforming process is performed.

For example, the base station 100-1 transmits the above gain-related information as a portion of system information. The information acquisition unit 261 acquires the above gain-related information included in the system information.

Note that the above gain-related information includes information differing between the above case 1, case 2, and case 3 relating to beamforming. This will be described in detail below.

Parameters

As described above, for example, the above control information includes one or more parameters for calculating the uplink transmission power (e.g., the desired reception power of an uplink signal, the transmission power of a CRS, and the coefficient of an estimated value of the transmission loss).

For example, the base station 100 transmits the above one or more parameters as a portion of system information. The information acquisition unit 261 acquires the above one or more parameters included in the system information.

(Communication Control Unit 263)

The communication control unit 263 controls the uplink transmission power on the basis of the above control information.

For example, the communication control unit 263 calculates the uplink transmission power on the basis of the above control information. Thereafter, the communication control unit 263 sets the calculated uplink transmission power. As a result, the terminal apparatus 200-1 transmits an uplink signal using the set transmission power.

As described above, in particular, in the first embodiment, the above control information includes the above gain-related information. Also, for example, the above control information includes the above one or more parameters (e.g., the desired reception power of an uplink signal, the transmission power of a CRS, and the coefficient of an estimated value of the transmission loss). In other words, the communication control unit 263 calculates the uplink transmission power on the basis of the above gain-related information and the above one or more parameters.

Note that the calculated uplink transmission power differs between the above case 1, case 2, and case 3 relating to beamforming. This will be described in detail below.

(Display Control Unit 265)

The display control unit 265 controls display of an output screen that is performed by the display unit 250. For example, the display control unit 265 generates an output screen that is displayed by the display unit 250, and causes the display unit 250 to display the output screen.

<<3.3. Specific Cases>>

Next, specific cases relating to beamforming will be described. As described above, specific cases relating to beam include case 1, case 2, and case 3.

<3.3.1. Case 1>

Firstly, case 1 relating to beamforming will be described. As described above, in case 1, an uplink beamforming process is performed, and a downlink beamforming process is not performed on a CRS.

(Base Station 100-1: Information Acquisition Unit 151)

Gain-Related Information

In case 1, the above gain-related information includes information about the uplink reception antenna gain in the case where an uplink beamforming process is performed (hereinafter referred to as "UL gain-related information"). The above reception antenna gain is the reception antenna gain of the base station 100-1.

Specifically, for example, the above UL gain-related information includes information indicating the difference between the uplink reception antenna gain and the downlink transmission antenna gain in the case where an uplink beamforming process is performed. The above transmission antenna gain is the transmission antenna gain of the base station 100-1. Also, in case 1, the above transmission antenna gain is the antenna gain in the case where a downlink beamforming process is not performed. The gain difference $G_R$ (dB) between the above reception antenna gain and the above transmission antenna gain is represented below, where $g_{R\_BF}$ represents the above reception antenna gain as an absolute gain, and $g_T$ represents the above transmission antenna gain as an absolute gain.

$$G_R = g_{R\_BF} - g_T \qquad \text{[Math. 5]}$$

In case 1, for example, thus, the information acquisition unit 151 of the base station 100-1 acquires the UL gain-related information including the gain difference $G_R$.

Note that the downlink transmission antenna gain $g_T$ in the case where a beamforming process is not performed is, for example, the transmission antenna gain of an antenna for transmitting a CRS (e.g., a non-directional antenna or a sector antenna). Of course, when a CRS is transmitted by a directional antenna, the transmission antenna gain $g_T$ may be the transmission antenna gain of the above directional antenna in the case where a downlink beamforming process is not performed.

(Base Station 100-1: Communication Control Unit 153)

Execution of Beamforming Process

In the first case, the communication control unit 153 performs an uplink beamforming process. Specifically, for example, the communication control unit 153 multiplies a received uplink signal by a weight coefficient for each antenna element.

Meanwhile, the communication control unit 153 does not perform a downlink beamforming process on a CRS. Specifically, for example, the communication control unit 153 does not multiply a CRS by weight coefficients weight coefficients. As a result, a CRS is transmitted using radio waves generated without beamforming (e.g., non-directional radio waves radiated by a non-directional antenna, a sector beam radiated by a sector antenna, etc.).

Also, the communication control unit 153 performs a downlink beamforming process on, for example, a downlink signal that does not include a CRS (e.g., a data signal, any control signal, etc.). Specifically, for example, the communication control unit 153 multiplies the above downlink signal by a weight coefficient for each antenna element. As a result, the above downlink signal is transmitted using a directional beam (e.g., a three-dimensional beam).

(Terminal Apparatus 200-1: Information Acquisition Unit 261)

Gain-Related Information

In case 1, the above gain-related information includes the above UL gain-related information. In other words, the information acquisition unit 261 of the terminal apparatus 200-1 acquires the above UL gain-related information.

(Terminal Apparatus 200-1: Communication Control Unit 263)

Calculation of Uplink Transmission Power

In case 1, the communication control unit 263 of the terminal apparatus 200-1 calculates the uplink transmission power on the basis of the above UL gain-related information and the above one or more parameters.

As described above, the above UL gain-related information includes, for example, the gain difference $G_R$. Also, the above one or more parameters include, for example, the desired reception power of an uplink signal, the transmission power of a CRS, and the coefficient of an estimated value of the transmission loss.

Initially, the communication control unit 263 estimates, for example, the downlink transmission loss $PL_C$ (dB) on the basis of the transmission power $P_{T\_CRS}$ of a CRS, and the reception power $P_{R\_CRS}$ of the CRS measured by the terminal apparatus 200-1.

$$PL_c = P_{T\_CRS} - P_{R\_CRS} \qquad \text{[Math. 6]}$$

Thereafter, the communication control unit 263 calculates the transmission power $P_{PUSCH,\,c}(i)$ (dBm) that is used by the terminal apparatus 200-1 for an uplink data channel in a sub-frame i, in a serving cell c, as follows.

$$P_{PUSCH,c}(i) = \min\begin{Bmatrix} P_{CMAX,c}(i), \\ 10\log_{10}(M_{PUSCH,c}(i)) + P_{O\_PUSCH,c}(j) + \\ \alpha_c(j) \cdot PL_c - G_R + \Delta_{TF,c}(i) + f_c(i) \end{Bmatrix} \qquad \text{[Math. 7]}$$

$P_{CMAX,\,c}(i)$ is the maximum transmission power of a terminal apparatus. $M_{PUSCH,\,c}(i)$ is a bandwidth that is determined on the basis of the number of resource blocks arranged in the frequency direction. $P_{O\_PUSCH,\,c}(j)$ is the desired reception power of an uplink signal. $\text{Alpha}_C(j)$ (alpha is a Greek letter) is the coefficient of an estimated value of the transmission loss. $f_c(i)$ is the accumulated value of adjusted power by a TPC command reported by scheduling information or the like. $\text{Delta}_{TF,\,c}(i)$ (delta is a Greek letter) is the offset of the transmission power with respect to a desired SINR that is determined on the basis of the modulation scheme and the coding rate or the like.

As described above, in case 1, an uplink beamforming process is performed, and therefore, there is a risk that the uplink transmission power may be excessively high. However, by the calculation of the uplink transmission power on the basis of the UL gain-related information (e.g., the gain difference $G_R$), the transmission power is adjusted. Specifically, for example, the uplink transmission power decreases according to the gain difference $G_R$. As a result, interference of an uplink signal with other signals can be reduced.

(Others)

Note that the UL gain-related information transmitted by the base station 100-1 is not limited to an example in which the UL gain-related information includes the gain difference $G_R$. The above UL gain-related information may include other information that allows for calculation of the above uplink transmission power $P_{PUSCH,\,c}(i)$, instead of the gain difference $G_R$.

As a first example, the above UL gain-related information may include information indicating the above reception antenna gain. Specifically, the above reception antenna gain may be the absolute gain $g_{R\_BF}$. Also, the above gain-related information may further include information indicating the above transmission antenna gain. The transmission antenna gain may be the absolute gain $g_T$. As a result, the terminal apparatus 200-1 can calculate, for example, the gain difference $G_R$, and can calculate the above uplink transmission power $P_{PUSCH,\,c}(i)$.

As a second example, the above UL gain-related information may be information indicating the number of antenna elements corresponding to an uplink beamforming process. The antenna gain is determined on the basis of the number of antenna elements. Therefore, the terminal apparatus 200-1 can calculate, for example, the gain difference $G_R$ between the uplink reception antenna gain and the downlink transmission antenna gain from the number of antenna elements (N antenna elements) used in uplink and the number of antenna elements (one antenna element) used in downlink. Therefore, the terminal apparatus 200-1 can calculate the above uplink transmission power $P_{PUSCH,\,c}(i)$.

<3.3.2. Case 2>

Next, case 2 relating to beamforming will be described. As described above, in the second case, a downlink beamforming process is performed on a CRS, and an uplink beamforming process is not performed.

(Base Station 100-1: Information Acquisition Unit 151)

Gain-Related Information

In case 2, the above gain-related information includes information about the downlink transmission antenna gain in the case where a downlink beamforming process is performed (hereinafter referred to as "DL gain-related information"). The above transmission antenna gain is the transmission antenna gain of the base station 100-1.

Specifically, for example, the above DL gain-related information includes information indicating the difference between the downlink transmission antenna gain and the uplink reception antenna gain in the case where a downlink beamforming process is performed. The above reception antenna gain is the reception antenna gain of the base station 100-1. Also, in case 2, the above reception antenna gain is the antenna gain in the case where an uplink beamforming process is not performed. The gain difference $G_T$ (dB) between the above transmission antenna gain and the above reception antenna gain is represented below, where $g_{T\_BF}$ represents the above transmission antenna gain as an absolute gain, and $g_R$ represents the above reception antenna gain as an absolute gain.

$$G_T = g_{T\_BF} - g_R \qquad \text{[Math. 8]}$$

In case 2, for example, thus, the information acquisition unit 151 of the base station 100-1 acquires the DL gain-related information including the gain difference $G_T$.

Note that the uplink reception antenna gain $g_R$ in the case where a beamforming process is not performed is, for example, the reception antenna gain of an antenna for receiving an uplink signal (e.g., a non-directional antenna or a sector antenna). Of course, when an uplink signal is received by a directional antenna, the reception antenna gain $g_R$ may be the reception antenna gain of the above directional antenna in the case where an uplink beamforming process is not performed.

(Base Station 100-1: Communication Control Unit 153)
Execution of Beamforming Process In the second case, the communication control unit 153 performs a downlink beamforming process on a CRS. Specifically, for example, the communication control unit 153 multiplies a CRS by a weight coefficient for each antenna element. As a result, the CRS is transmitted using a directional beam (e.g., a three-dimensional beam).

Also, the communication control unit 153 also performs a downlink beamforming process on, for example, a downlink signal that does not include a CRS (e.g., a data signal, any control signal, etc.). Specifically, for example, the communication control unit 153 multiplies the above downlink signal by a weight coefficient for each antenna element. As a result, the above downlink signal is transmitted using a directional beam (e.g., a three-dimensional beam).

Meanwhile, the communication control unit 153 does not perform an uplink beamforming process. Specifically, for example, the communication control unit 153 does not multiply a received uplink signal by weight coefficients.

(Terminal Apparatus 200-1: Information Acquisition Unit 261)
Gain-Related Information In case 2, the above gain-related information includes the above DL gain-related information. In other words, the information acquisition unit 261 of the terminal apparatus 200-1 acquires the above DL gain-related information.

(Terminal Apparatus 200-1: Communication Control Unit 263)
Calculation of Uplink Transmission Power In case 2, the communication control unit 263 of the terminal apparatus 200-1 calculates the uplink transmission power on the basis of the above DL gain-related information and the above one or more parameters.

As described above, the above DL gain-related information includes, for example, the gain difference $G_T$. Also, the above one or more parameters include, for example, the desired reception power of an uplink signal, the transmission power of a CRS, and the coefficient of an estimated value of the transmission loss.

Initially, the communication control unit 263 estimates, for example, the downlink transmission loss $PL_C$ (dB) on the basis of the transmission power $P_{T\_CRS}$ of a CRS, the reception power $P_{R\_CRS}$ of a CRS measured by the terminal apparatus 200-1, and the gain difference $G_T$, as follows.

$$PL_c = P_{T\_CRS} + G_T - P_{R\_CRS} \qquad \text{[Math. 9]}$$

Thereafter, the communication control unit 263 calculates the transmission power $P_{PUSCH,\,c}(i)$ (dBm) that is used by the terminal apparatus 200-1 for an uplink data channel in a sub-frame i, in a serving cell c, as follows.

$$P_{PUSCH,c}(i) = \min\left\{\begin{array}{l} P_{CMAX,c}(i), \\ 10\log_{10}(M_{PUSCH,c}(i)) + P_{O\_PUSCH,c}(j) + \\ \alpha_c(j) \cdot PL_c + \Delta_{TF,c}(i) + f_c(i) \end{array}\right\} \qquad \text{[Math. 10]}$$

$P_{CMAX,\,c}(i)$, $M_{PUSCH,\,c}(i)$, $P_{O\_PUSCH,\,c}(j)$, $alpha_C(j)$, $f_c(i)$, and $delta_{TF,\,c}(i)$ are as described in case 1.

As described above, in case 2, a downlink beamforming process is performed on a CRS, and therefore, there is a risk that the uplink transmission power may be insufficient. However, by the calculation of the uplink transmission power on the basis of the above DL gain-related information (e.g., the gain difference $G_T$), the transmission power is adjusted. Specifically, for example, the uplink transmission power increases according to the gain difference $G_T$. As an example, as described above, the value of the transmission loss increases according to the gain difference $G_T$, resulting in an increase in the uplink transmission power. As a result, a decrease in uplink transmission quality can be reduced.

(Others)

Note that the DL gain-related information transmitted by the base station 100-1 is not limited to an example in which the DL gain-related information includes the gain difference $G_T$. The above DL gain-related information may include another information that allows for calculation of the above uplink transmission power $P_{PUSCH,\,c}(i)$, instead of the gain difference $G_T$.

As a first example, the above DL gain-related information may include information indicating the above transmission antenna gain. Specifically, the above transmission antenna gain may be the absolute gain $g_{T\_BF}$. Also, the above gain-related information may further include information indicating the above reception antenna gain. The reception antenna gain may be the absolute gain $g_R$. As a result, for example, the terminal apparatus 200-1 can calculate the gain difference $G_T$, and can calculate the above uplink transmission power $P_{PUSCH,\,c}(i)$.

As a second example, the above DL gain-related information may be information indicating the number of antenna elements corresponding to a downlink beamforming process. The antenna gain is determined on the basis of the number of antenna elements. Therefore, the terminal apparatus 200-1 can calculate, for example, the gain difference $G_T$ between the downlink transmission antenna gain and the uplink reception antenna gain from the number of antenna elements (N antenna elements) used in downlink and the number of antenna elements (one antenna element) used in uplink. Therefore, the terminal apparatus 200-1 can calculate the above uplink transmission power $P_{PUSCH,\,c}(i)$.

<3.3.3. Case 3>

Next, case 3 relating to beamforming will be described. As described above, in case 3, an uplink beamforming process, and a downlink beamforming process on a CRS, are both performed.

(Base Station 100-1: Information Acquisition Unit 151)

Gain-Related Information

In case 3, the above gain-related information includes information (UL/DL gain-related information) about the uplink reception antenna gain in the case where an uplink beamforming process is performed and the downlink transmission antenna gain in the case where a downlink beamforming process is performed. The above reception antenna gain is the reception antenna gain of the base station 100-1, and the above transmission antenna gain is the transmission antenna gain of the base station 100-1.

For example, the above UL/DL gain-related information includes the above UL gain-related information described in relation to case 1, and the above DL-related information described in relation to case 2. As described above, the above UL gain-related information includes the gain difference $G_R$ between the uplink reception antenna gain $g_{R\_BF}$ in the case where an uplink beamforming process is performed, and the transmission antenna gain $g_T$ in the case where a downlink beamforming process is not performed. Also, the above DL gain-related information includes the gain difference $G_T$ between the downlink transmission antenna gain $g_{T\_BF}$ in the case where a downlink beamforming process is performed, and the reception antenna gain $g_R$ in the case where an uplink beamforming process is not performed.

In case 3, for example, thus, the information acquisition unit 151 of the base station 100-1 acquires the UL gain-related information including the gain difference $G_R$, and the DL gain-related information including the gain difference $G_T$.

(Base Station 100-1: Communication Control Unit 153)

Execution of Beamforming Process

In the third case, the communication control unit 153 performs an uplink beamforming process. Specifically, for example, the communication control unit 153 multiplies a received uplink signal by a weight coefficient for each antenna element.

In the third case, moreover, the communication control unit 153 performs a downlink beamforming process on a CRS. Specifically, for example, the communication control unit 153 multiplies a CRS by a weight coefficient weight coefficient for each antenna element. As a result, the CRS is transmitted using a directional beam (e.g., a three-dimensional beam).

Also, the communication control unit 153 performs a downlink beamforming process on, for example, a downlink signal that does not include a CRS (e.g., a data signal, any control signal, etc.). Specifically, for example, the communication control unit 153 multiplies the above downlink signal by a weight coefficient for each antenna element. As a result, the above downlink signal is transmitted using a directional beam (e.g., a three-dimensional beam).

(Terminal Apparatus 200-1: Information Acquisition Unit 261)

Gain-Related Information

In case 3, the above gain-related information includes the above UL/DL gain-related information. In other words, the information acquisition unit 261 acquires the above UL/DL gain-related information. The above UL/DL gain-related information includes, for example, the UL gain-related information and the DL gain-related information.

(Terminal Apparatus 200-1: Communication Control Unit 263)

Execution of Uplink Transmission Power

In case 3, the communication control unit 263 of the terminal apparatus 200-1 calculates the uplink transmission power on the basis of the above UL/DL gain-related information (e.g., the UL gain-related information and the DL gain-related information) and the above one or more parameters.

As described above, the above UL gain-related information includes, for example, the gain difference $G_R$, and the above DL gain-related information includes, for example, the gain difference $G_T$. Also, the above one or more parameters include, for example, the desired reception power of an uplink signal, the transmission power of a CRS, and the coefficient of an estimated value of the transmission loss.

Initially, the communication control unit 263 estimates the downlink transmission loss $PL_C$ (dB) from, for example, the transmission power $P_{T\_CRS}$ of a CRS, the reception power $P_{R\_CRS}$ of a CRS measured by the terminal apparatus 200-1, and the gain difference $G_T$, as follows.

$$PL_c = P_{T\_CRS} + G_T - P_{R\_CRS} \qquad [\text{Math. 11}]$$

Thereafter, the communication control unit 263 calculates the transmission power $P_{PUSCH,\,c}(i)$ (dBm) that is used by the terminal apparatus 200-1 for an uplink data channel in a sub-frame i, in a serving cell c, as follows.

$$P_{PUSCH,c}(i) = \min\left\{ \begin{array}{l} P_{CMAX,c}(i), \\ 10\log_{10}(M_{PUSCH,c}(i)) + P_{O\_PUSCH,c}(j) + \\ \alpha_c(j) \cdot PL_c - G_R + \Delta_{TF,c}(i) + f_c(i) \end{array} \right\} \qquad [\text{Math. 12}]$$

$P_{CMAX,\,c}(i)$, $M_{PUSCH,\,c}(i)$, $P_{O\_PUSCH,\,c}(j)$, $\text{alpha}_C(j)$, $f_c(i)$, and $\text{delta}_{TF,\,c}(i)$ are as described in case 1.

As described above, in case 3, there is a risk that the uplink transmission power may be excessively high or insufficient. However, by the calculation of the uplink transmission power on the basis of the above UL/DL gain-related information (e.g., the gain difference $G_R$ and the gain difference $G_T$), the transmission power is adjusted. Specifically, for example, the uplink transmission power decreases according to the gain difference $G_R$, and the uplink transmission power increases according to the gain difference $G_T$, and therefore, the uplink transmission power is determined according to the difference between the uplink reception antenna gain and the downlink transmission antenna gain. Therefore, the uplink transmission power has an appropriate level. As a result, interference of an uplink signal with other signals and a decrease in uplink transmission quality can be reduced.

(Others)

Note that the UL/DL gain-related information transmitted by the base station 100-1 is not limited to an example in which the UL/DL gain-related information includes the above UL gain-related information and the above DL gain-related information. The above UL gain-related information may include another information that allows for calculation of the above uplink transmission power $P_{PUSCH,\,c}(i)$, instead of containing the above UL gain-related information (e.g., the gain difference $G_R$) and the above DL gain-related information (e.g., the gain difference $G_T$).

For example, the UL/DL gain-related information may include information indicating the difference between the uplink reception antenna gain in the case where an uplink beamforming process is performed, and the downlink transmission antenna gain in the case where a downlink beamforming process is performed.

First Example

As a first example, the difference between the above reception antenna gain and the above transmission antenna gain may be a gain difference $G_R'$ below, where $g_{R\_BF}$ represents the above reception antenna gain as an absolute gain, and $g_{T\_BF}$ represents the above transmission antenna gain as an absolute gain.

$$G_R' = g_{R\_BF} - g_{T\_BF} \qquad \text{[Math. 13]}$$

Thus, when the UL/DL gain-related information includes information indicating the gain difference $G_R'$, the terminal apparatus 200-1 (the communication control unit 263) may calculate the transmission power $P_{PUSCH,c}(i)$ (dBm) that is used by the terminal apparatus 200-1 for an uplink data channel in a sub-frame i, in a serving cell c, as follows.

$$P_{PUSCH,c}(i) = \min\begin{Bmatrix} P_{CMAX,c}(i), \\ 10\log_{10}(M_{PUSCH,c}(i)) + P_{O\_PUSCH,c}(j) + \\ \alpha_c(j) \cdot PL_c - G_R' + \Delta_{TF,c}(i) + f_c(i) \end{Bmatrix} \qquad \text{[Math. 14]}$$

$$PL_c = P_{T\_CRS} - P_{R\_CRS} \qquad \text{[Math. 15]}$$

Second Example

As a second example, the difference between the above reception antenna gain and the above transmission antenna gain may be a gain difference $G_T'$ below, where $g_{R\_BF}$ represents the above reception antenna gain as an absolute gain, and $g_{T\_BF}$ represents the above transmission antenna gain as an absolute gain.

$$G_T' = g_{T\_BF} - g_{R\_BF} \qquad \text{[Math. 16]}$$

Thus, when the UL/DL gain-related information includes information indicating the gain difference $G_T'$, the terminal apparatus 200-1 (the communication control unit 263) may calculate the transmission power $P_{PUSCH,c}(i)$ (dBm) that is used by the terminal apparatus 200-1, for an uplink data channel in a sub-frame i, in a serving cell c, as follows.

$$P_{PUSCH,c}(i) = \min\begin{Bmatrix} P_{CMAX,c}(i), \\ 10\log_{10}(M_{PUSCH,c}(i)) + P_{O\_PUSCH,c}(j) + \\ \alpha_c(j) \cdot PL_c + \Delta_{TF,c}(i) + f_c(i) \end{Bmatrix} \qquad \text{[Math. 17]}$$

$$PL_c = P_{T\_CRS} + G_T' - P_{R\_CRS} \qquad \text{[Math. 18]}$$

Note that the above UL/DL gain-related information can be said to be the UL gain-related information and the DL gain-related information.

<<<3.4. Flow of Process>>>

Next, an example of a communication control process according to the first embodiment will be described with reference to FIG. 14 and FIG. 15.

(Communication Control Process in Base Station)

Figure 14:
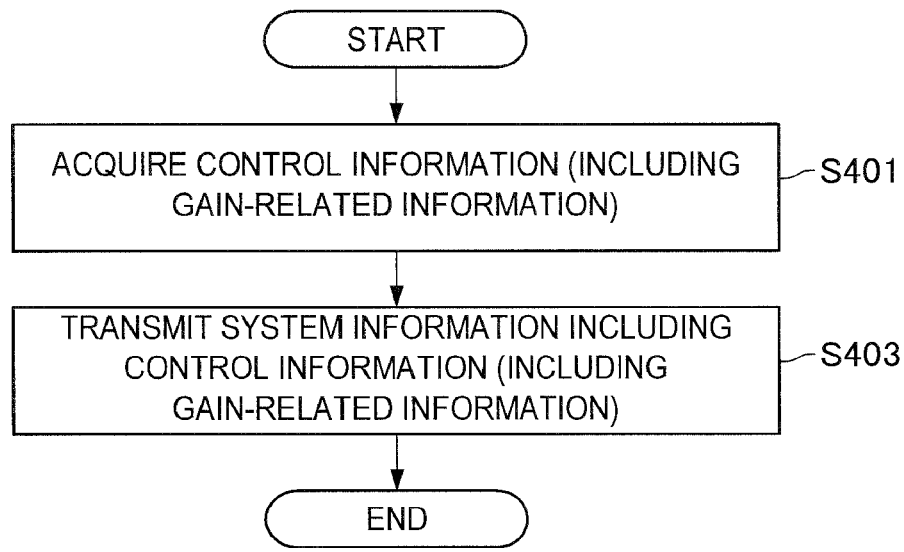
FIG. 14 is a flowchart showing an example of a schematic flow of a communication control process in a base station according to the first embodiment.

FIG. 14 is a flowchart showing an example of a schematic flow of a communication control process in a base station according to the first embodiment.

The information acquisition unit 151 acquires control information for determining the uplink transmission power (S401). In the first embodiment, the control information includes gain-related information about the antenna gain in the case where a beamforming process is performed.

Thereafter, the base station 100-1 transmits system information including the above control information (containing the above gain-related information) to the terminal apparatus 200-1 under the control of the communication control unit 153 (S403).

(Communication Control Process in Terminal Apparatus)

Figure 15:
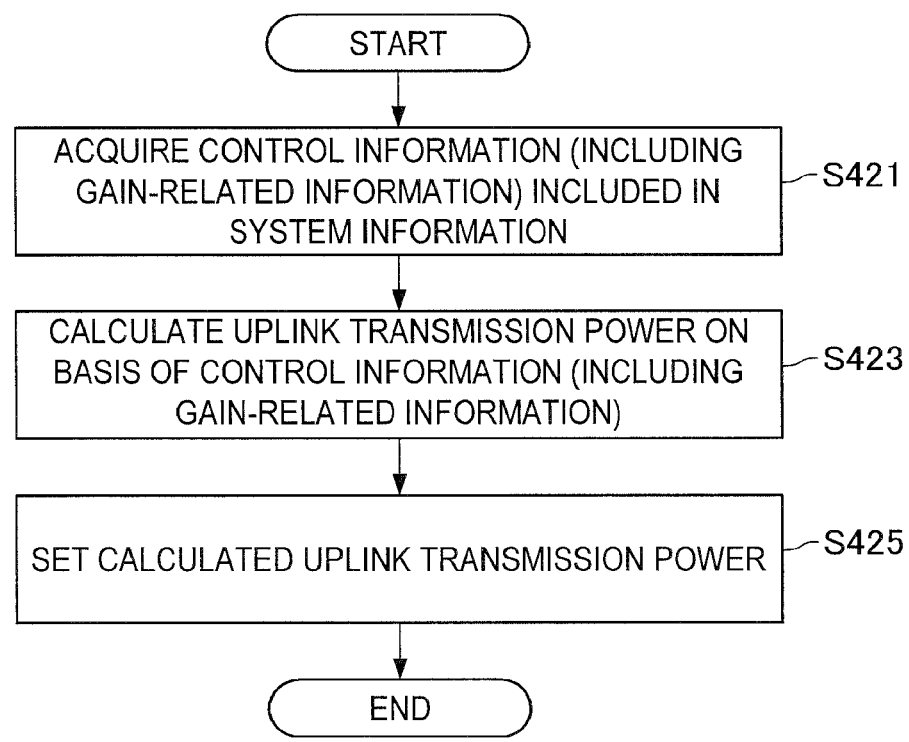
FIG. 15 is a flowchart showing an example of a schematic flow of a communication control process in a terminal apparatus according to the first embodiment.

FIG. 15 is a flowchart showing an example of a schematic flow of a communication control process in a terminal apparatus according to the first embodiment.

The information acquisition unit 261 acquires control information for determining the uplink transmission power that is included in system information (S421). In the first embodiment, the control information includes gain-related information about the antenna gain in the case where a beamforming process is performed.

Thereafter, the communication control unit 263 calculates the uplink transmission power on the basis of the above control information including the above gain-related information (S423).

Thereafter, the communication control unit 263 sets the calculated uplink transmission power (S425). Thereafter, the process ends.

In the foregoing, the first embodiment of the present disclosure has been described. According to the first embodiment, gain-related information about the antenna gain in the case where a beamforming process is performed is transmitted by the base station 100-1 to the terminal apparatus 200-1. Thereafter, the terminal apparatus 200-1 controls the uplink transmission power on the basis of the gain-related information. As a result, for example, uplink transmission can be performed using appropriate transmission power in the case where a beamforming process is performed.

<<<4. Second Embodiment>>>

Next, a second embodiment of the present disclosure will be described with reference to FIG. 16 to FIG. 19.

As described above, in an embodiment of the present disclosure, adjustment information for adjusting the uplink transmission power according to the antenna gain in the case where a beamforming process is performed is transmitted by a base station 100 to a terminal apparatus 200. In particular, in a second embodiment, the above control information includes one or more parameters for calculating the uplink transmission power, and includes one or more adjusted parameters that are adjusted according to the above antenna gain, of the above one or more parameters, as the above adjustment information.

<<<4.1. Configuration of Base Station>>

Figure 16:
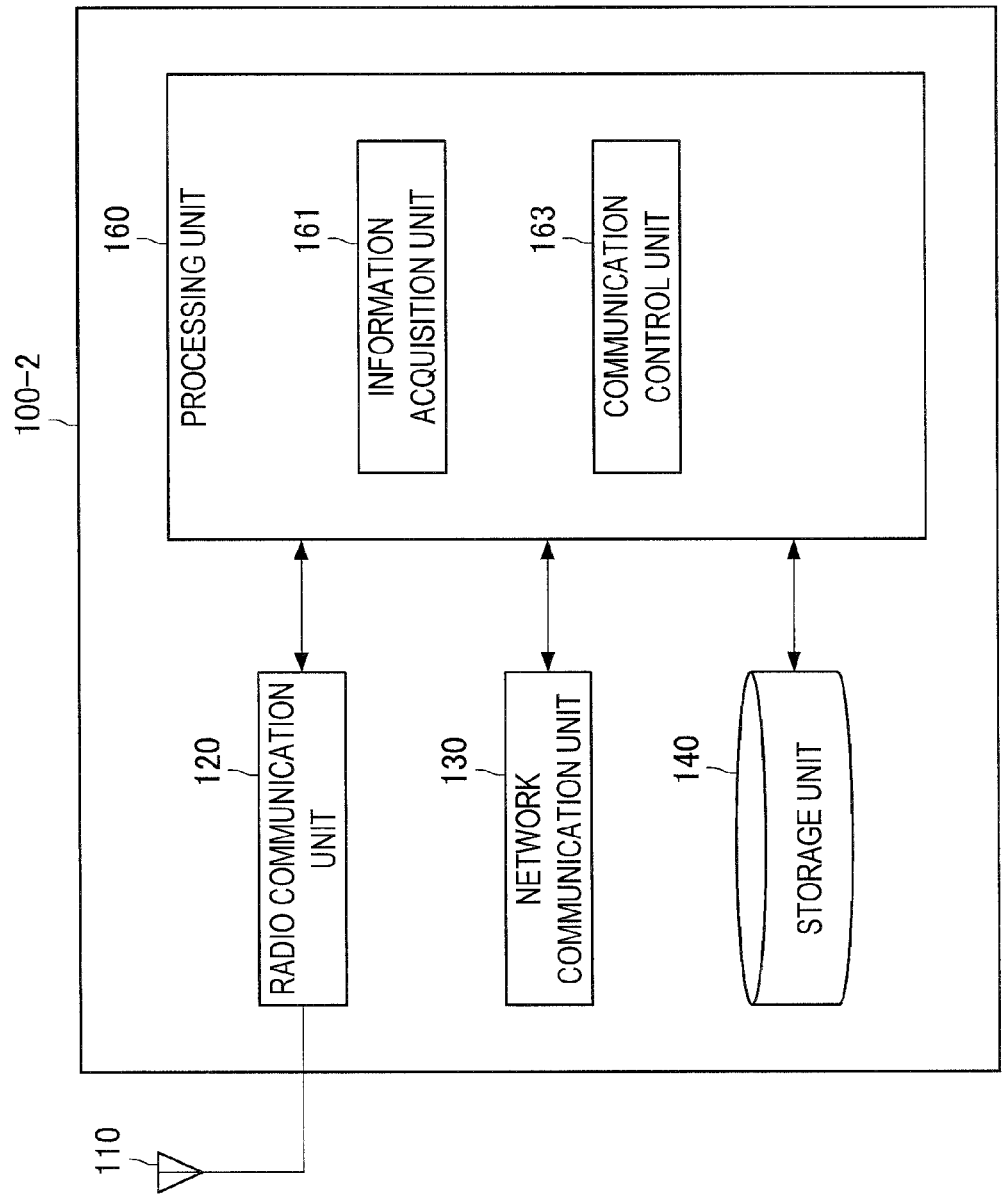
FIG. 16 is a block diagram showing an example of a configuration of a base station according to a second embodiment.

Firstly, an example of a configuration of a base station 100-2 according to the second embodiment will be described with reference to FIG. 16. FIG. 16 is a block diagram showing an example of a configuration of the base station 100-2 according to the second embodiment. Referring to FIG. 16, the base station 100-2 includes an antenna unit 110, a radio communication unit 120, a network communication unit 130, a storage unit 140, and a processing unit 160.

Here, the antenna unit 110, the radio communication unit 120, the network communication unit 130, and the storage unit 140 are not particularly different between the first embodiment and the second embodiment. Therefore, here, the processing unit 160 will be described.

(Processing Unit 160)

The processing unit 160 provides various functions of the base station 100-2. The processing unit 160 includes an information acquisition unit 161 and a communication control unit 163.

(Information Acquisition Unit 161)

The information acquisition unit 161 acquires control information for determining the uplink transmission power. In an embodiment of the present disclosure, the above control information includes adjustment information for adjusting the transmission power according to the antenna gain in the case where a beamforming process is performed.

Parameters

In particular, in the second embodiment, the above control information includes one or more parameters for calculating the uplink transmission power. Also, the above control information includes one or more adjusted parameters that are adjusted according to the above antenna gain, of the one or more parameters, as the above adjustment information.

The above one or more parameters include, for example, the desired reception power of an uplink signal, and the transmission power of a CRS. Moreover, the above one or more parameters include, for example, the coefficient of an estimated value of the transmission loss.

Also, the above at least one adjusted parameter includes, for example, at least one of the desired reception power of an uplink signal and the transmission power of a CRS.

Note that the at least one adjusted parameter includes information differing between the above case 1, case 2, and case 3 relating to beamforming. This will be described in detail below.

(Communication Control Unit 163)

The communication control unit 163 controls radio communication of the base station 100-2.

Control of Transmission of Control Information

In particular, in an embodiment of the present disclosure, the communication control unit 163 controls transmission of the above control information to a terminal apparatus 200-2. In other words, the base station 100-2 transmits the above control information to the terminal apparatus 200-2 under the control of the communication control unit 163.

As described above, in particular, in the second embodiment, the above control information includes one or more parameters for calculating the uplink transmission power. The communication control unit 163 controls transmission of the above one or more parameters.

For example, the communication control unit 163 controls transmission of the above at least one adjusted parameter to the terminal apparatus 200-2 so that the above at least one adjusted parameter that is adjusted according to the above antenna gain is transmitted as a portion of system information using a directional beam. In other words, the base station 100-2 transmits the above at least one adjusted parameter as a portion of system information to the terminal apparatus 200-2 using a directional beam under the control of the communication control unit 163. In other words, the above at least one adjusted parameter is transmitted to a directional area. Also, the above at least one adjusted parameter is contained in, for example, any system information block (SIB) of the above system information.

In a specific process, for example, the communication control unit 163 maps a signal of the above at least one adjusted parameter to radio resources allocated to an SIB containing the above at least one adjusted parameter. Thereafter, the communication control unit 163 multiplies the above mapped signal by weight coefficients for forming a directional beam. As a result, the above at least one adjusted parameter is transmitted as a portion of the SIB using a directional beam. Note that the above SIB may be entirely transmitted using a directional beam, or only a portion of the above SIB that contains the above at least one adjusted parameter may be transmitted using a directional beam, and the remainder of the above SIB may be transmitted using radio waves generated without beamforming.

Such transmission of the above at least one adjusted parameter using a directional beam allows for, for example, transmission of different parameters (parameters adjusted according to the antenna gain) using different directional beams. Therefore, even when different antenna gains are used for different directional beams or the above at least one adjusted parameter (e.g., the transmission power of a CRS) is changed for each directional beam, appropriate parameter information corresponding to the directional beam can be reported to the terminal apparatus 200-2.

Note that, of the above one or more parameters for calculating the uplink transmission power, a parameter(s) other than the above at least one adjusted parameter is also included in, for example, the above system information.

<<4.2. Configuration of Terminal Apparatus>>

Figure 17:
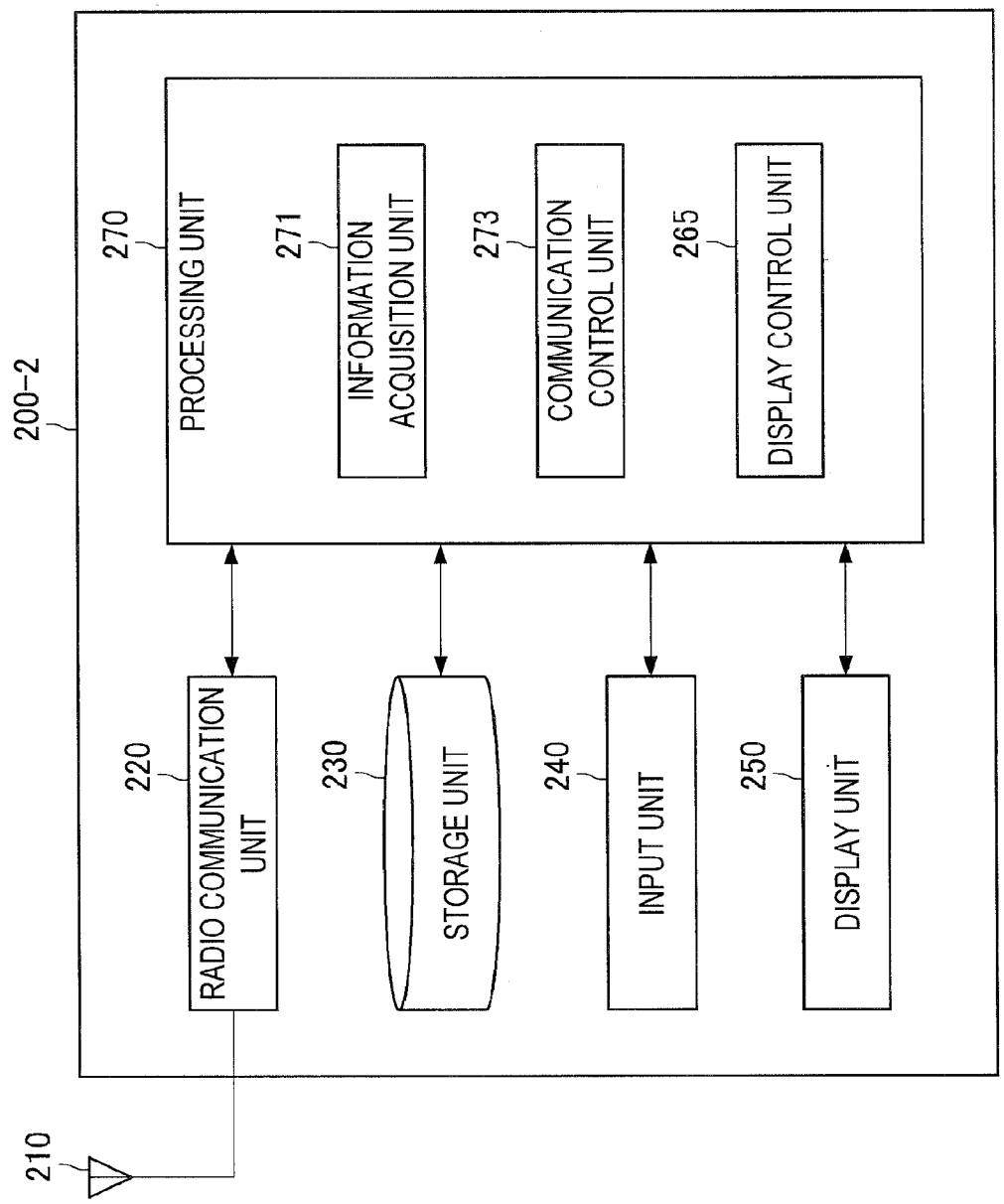
FIG. 17 is a block diagram showing an example of a configuration of a terminal apparatus according to the second embodiment.

Next, an example of a configuration of the terminal apparatus 200-2 according to the second embodiment will be described with reference to FIG. 17. FIG. 17 is a block diagram showing an example of a configuration of the terminal apparatus 200-2 according to the second embodiment. Referring to FIG. 17, the terminal apparatus 200-2 includes an antenna unit 210, a radio communication unit 220, a storage unit 230, an input unit 240, a display unit 250, and a processing unit 270.

Here, the antenna unit 210, the radio communication unit 220, the storage unit 230, the input unit 240, and the display unit 250, and a display control unit 265 included in the processing unit 270, are not particularly different between the first embodiment and the second embodiment. Therefore, components other than the display control unit 265 of the processing unit 270 will now be described.

(Information Acquisition Unit 271)

An information acquisition unit 271 acquires control information for determining the uplink transmission power. For example, when the base station 100-2 transmits the above control information, the information acquisition unit 271 acquires the control information.

Parameters

As described above, in an embodiment of the present disclosure, the above control information includes adjustment information for adjusting the transmission power according to the antenna gain in the case where a beamforming process is performed. Also, as described above, in particular, in the second embodiment, the control information includes one or more parameters for calculating the uplink transmission power, and at least one adjusted parameter that is adjusted according to the above antenna gain, of the one or more parameters, as the above adjustment information.

For example, the base station 100-2 transmits the above one or more parameters for calculating the uplink transmission power as a portion of system information, and the information acquisition unit 271 acquires the above one or more parameters included in the system information.

Note that the above at least one adjusted parameter differs between the above case 1, case 2, and case 3 relating to beamforming. This will be described in detail below.

(Communication Control Unit 273)

The communication control unit 273 controls the uplink transmission power on the basis of the above control information.

For example, the communication control unit 273 calculates the uplink transmission power on the basis of the above control information. Thereafter, the communication control unit 273 sets the calculated uplink transmission power. As a result, the terminal apparatus 200-2 transmits an uplink signal using the set transmission power.

As described above, in particular, in the second embodiment, the above control information includes one or more parameters for calculating the uplink transmission power, and the one or more parameters include one or more adjusted parameters that are adjusted according to the antenna gain in the case where a beamforming process is performed. In other words, the communication control unit 273 calculates the uplink transmission power on the basis of the above one or more parameters.

Note that the calculated uplink transmission power differs between the above case 1, case 2, and case 3 relating to beamforming. This will be described in detail below.

<<4.3. Specific Cases>>

Next, specific cases relating to beamforming will be described. As described above, specific cases relating to beam include case 1, case 2, and case 3.

<4.3.1. Case 1>

Firstly, case 1 relating to beamforming will be described. As described above, in case 1, an uplink beamforming process is performed, and a downlink beamforming process is not performed on a CRS.

(Base Station 100-2: Information Acquisition Unit 161)

Parameters

In case 1, the above at least on adjusted parameter includes a parameter that is adjusted according to the antenna gain in the case where an uplink beamforming process is performed (hereinafter referred to as an "UL adjusted parameter"). The above reception antenna gain is the reception antenna gain of the base station 100-2.

As an example, the above UL adjusted parameter is the desired reception power $P_{O\_BF\_PUSCH,\,c}(j)$ of an uplink signal that is adjusted according to the uplink reception antenna gain in the case where an uplink beamforming process is performed. The desired reception power $P_{O\_BF\_PUSCH,\,c}(j)$ is, for example, calculated using the desired uplink reception power $P_{O\_PUSCH,\,c}(j)$ before adjustment, and the above gain difference $G_R$ between the reception antenna gain and the transmission antenna gain.

$$P_{O\_BF\_PUSCH,c}(j) = P_{O\_PUSCH,c}(j) - G_R \quad [\text{Math. 19}]$$

Note that the above the gain difference $G_R$ is the difference between the uplink reception antenna gain in the case where an uplink beamforming process is performed, and the downlink transmission antenna gain in the case where a downlink beamforming process is not performed.

In case 1, for example, thus, the information acquisition unit 161 of the base station 100-2 acquires the UL adjusted parameter (e.g., the desired reception power $P_{O\_BF\_PUSCH,\,c}(j)$ of an uplink signal).

(Base Station 100-2: Communication Control Unit 163)

Execution of Beamforming Process

In the first case, the communication control unit 163 performs an uplink beamforming process. Specifically, for example, the communication control unit 163 multiplies a received uplink signal by a weight coefficient for each antenna element.

Meanwhile, the communication control unit 163 does not perform a downlink beamforming process on a CRS. Specifically, for example, the communication control unit 163 does not multiply a CRS by weight coefficients weight coefficients. As a result, a CRS is transmitted using radio waves generated without beamforming (e.g., non-directional radio waves radiated by a non-directional antenna, a sector beam radiated by a sector antenna, etc.).

Also, the communication control unit 163 performs a downlink beamforming process on, for example, a downlink signal that does not include a CRS (e.g., a data signal, any control signal, etc.). Specifically, for example, the communication control unit 163 multiplies the above downlink signal by a weight coefficient for each antenna element. As a result, the above downlink signal is transmitted using a directional beam (e.g., a three-dimensional beam).

(Terminal Apparatus 200-2: Information Acquisition Unit 271)

Parameters

In case 1, the above at least one adjusted parameter includes the above UL adjusted parameter. In other words, the information acquisition unit 271 of the terminal apparatus 200-2 acquires the above UL adjusted parameter.

(Terminal Apparatus 200-2: Communication Control Unit 273)

Calculation of Uplink Transmission Power

In case 1, the communication control unit 273 of the terminal apparatus 200-2 calculates the uplink transmission power on the basis of the above one or more parameters including the above UL adjusted parameter.

As described above, the above UL adjusted parameter includes, for example, the desired reception power $P_{O\_BF\_PUSCH,\,c}(j)$ of an uplink signal that is adjusted according to the uplink reception antenna gain in the case where an uplink beamforming process is performed. Also, the above one or more parameters include, for example, the transmission power of a CRS and the coefficient of an estimated value of the transmission loss in addition to the above UL adjusted parameter.

Initially, the communication control unit 273 estimates the downlink transmission loss $PL_C$ (dB) from, for example, the transmission power $P_{T\_CRS}$ of a CRS and the reception power $P_{R\_CRS}$ of the CRS measured by the terminal apparatus 200-2.

$$PL_c = P_{T\_CRS} - P_{R\_CRS} \quad [\text{Math. 20}]$$

Thereafter, the communication control unit 273 calculates the transmission power $P_{PUSCH,\,c}(i)$ (dBm) that is used by the terminal apparatus 200-2 for an uplink data channel in a sub-frame i, in a serving cell c, as follows.

$$P_{PUSCH,c}(i) = \min \left\{ \begin{array}{l} P_{CMAX,c}(i), \\ 10\log_{10}(M_{PUSCH,c}(i)) + P_{O\_BF\_PUSCH,c}(j) + \\ \alpha_c(j) \cdot PL_c + \Delta_{TF,c}(i) + f_c(i) \end{array} \right\} \quad [\text{Math. 21}]$$

$P_{CMAX,\,c}(i)$ is the maximum transmission power of a terminal apparatus. $M_{PUSCH,\,c}(i)$ is a bandwidth that is determined on the basis of the number of resource blocks arranged in the frequency direction. $Alpha_c(j)$ (alpha is a Greek letter) is the coefficient of an estimated value of the transmission loss. $f_c(i)$ is the accumulated value of adjusted power by a TPC command reported by scheduling information or the like. $Delta_{TF,\,c}(i)$ (delta is a Greek letter) is the offset of the transmission power with respect to a desired SINR that is determined on the basis of the modulation scheme and the coding rate or the like.

As described above, in case 1, an uplink beamforming process is performed, and therefore, there is a risk that the uplink transmission power may be excessively high. However, by the calculation of the uplink transmission power on the basis of an adjusted parameter that is adjusted according to the uplink reception gain, the transmission power is adjusted. Specifically, for example, the uplink transmission power decreases according to an adjusted parameter that is adjusted according to the gain difference $G_R$ between the uplink reception antenna gain and the downlink transmission antenna gain. As an example, as described above, a value sent as desired uplink reception power (parameter) is adjusted to decrease according to the gain difference $G_R$, resulting in a decrease in the uplink transmission power. As a result, interference of an uplink signal with other signals can be reduced.

Note that the desired reception power $P_{O\_BF\_PUSCH,c}(j)$ of an uplink signal is an example of the UL adjusted parameter, and other parameters for calculating the uplink transmission power may be used as the UL adjusted parameter.

<4.3.2. Case 2>

Next, case 2 relating to beamforming will be described. As described above, in the second case, a downlink beamforming process is performed on a CRS, and an uplink beamforming process is not performed.

(Base Station 100-2: Information Acquisition Unit 161)

Parameters

In case 2, the above at least on adjusted parameter includes a parameter that is adjusted according to the downlink transmission antenna gain in the case where a downlink beamforming process is performed (hereinafter referred to as a "DL adjusted parameter"). The above transmission antenna gain is the transmission antenna gain of the base station 100-2.

As an example, the above DL adjusted parameter is the transmission power $P_{T\_CRS\_BF}$ of a CRS that is adjusted according to the downlink transmission antenna gain in the case where a downlink beamforming process is performed. The transmission power $P_{T\_CRS\_BF}$ is, for example, calculated using the actual transmission power $P_{T\_CRS}$ of a CRS and the above gain difference $G_T$ between the transmission antenna gain and the reception antenna gain, as follows.

$$P_{T\_CRS\_BF} = P_{T\_CRS} + G_T \quad [\text{Math. 22}]$$

Note that the above the gain difference $G_R$ is the difference between the downlink transmission antenna gain in the case where a downlink beamforming process is performed, and the uplink transmission antenna gain in the case where an uplink beamforming process is not performed.

In case 2, for example, thus, the information acquisition unit 161 of the base station 100-2 acquires the DL adjusted parameter (e.g., the transmission power $P_{T\_CRS\_BF}$ of a CRS).

(Base Station 100-2: Communication Control Unit 163)

Execution of Beamforming Process

In the second case, the communication control unit 163 performs a downlink beamforming process on a CRS. Specifically, for example, the communication control unit 163 multiplies a CRS by a weight coefficient weight coefficient for each antenna element. As a result, the CRS is transmitted using a directional beam (e.g., a three-dimensional beam).

Also, the communication control unit 163 performs a downlink beamforming process on, for example, a downlink signal that does not include a CRS (e.g., a data signal, any control signal, etc.). Specifically, for example, the communication control unit 163 multiplies the above downlink signal by a weight coefficient for each antenna element. As a result, the above downlink signal is transmitted using a directional beam (e.g., a three-dimensional beam).

Meanwhile, the communication control unit 163 does not perform an uplink beamforming process. Specifically, for example, the communication control unit 163 does not multiply a received uplink signal by weight coefficients.

(Terminal Apparatus 200-2: Information Acquisition Unit 271)

Parameters

In case 2, the above at least one adjusted parameter includes the above DL adjusted parameter. In other words, the information acquisition unit 271 of the terminal apparatus 200-2 acquires the above DL adjusted parameter.

(Terminal Apparatus 200-2: Communication Control Unit 273)

Calculation of Uplink Transmission Power

In case 2, the communication control unit 273 of the terminal apparatus 200-2 calculates the uplink transmission power on the basis of the above one or more parameters including the above DL adjusted parameter.

As described above, the above DL adjusted parameter includes, for example, the transmission power $P_{T\_CRS\_BF}$ of a CRS that is adjusted according to the downlink transmission antenna gain in the case where a downlink beamforming process is performed. Also, the above one or more parameters include, for example, the desired reception power of an uplink signal, and the coefficient of an estimated value of the transmission loss, in addition to the above DL adjusted parameter.

Initially, the communication control unit 273 estimates the downlink transmission loss $PL_C$ (dB) from, for example, the transmission power $P_{T\_CRS\_BF}$ of a CRS that is the above DL adjusted parameter, and the reception power $P_{R\_CRS}$ of a CRS measured by the terminal apparatus 200-2, as follows.

$$PL_c = P_{T\_CRS\_BF} - P_{R\_CRS} \quad [\text{Math. 23}]$$

Thereafter, the communication control unit 273 calculates the transmission power $P_{PUSCH,c}(i)$ (dBm) that is used by the terminal apparatus 200-2 for an uplink data channel in a sub-frame i, in a serving cell c, as follows.

$$P_{PUSCH,c}(i) = \min\left\{\begin{array}{l} P_{CMAX,c}(i), \\ 10\log_{10}(M_{PUSCH,c}(i)) + P_{O\_PUSCH,c}(j) + \\ \alpha_c(j) \cdot PL_c + \Delta_{TF,c}(i) + f_c(i) \end{array}\right\} \quad [\text{Math. 24}]$$

$P_{CMAX,c}(i)$, $M_{PUSCH,c}(i)$, $P_{O\_PUSCH,c}(j)$, $\text{alpha}_c(j)$, $f_c(i)$, and $\text{delta}_{TF,c}(i)$ are as described in case 1.

As described above, in case 2, a downlink beamforming process is performed on a CRS, and therefore, there is a risk that the uplink transmission power may be insufficient. However, by the calculation of the uplink transmission power on the basis of an adjusted parameter that is adjusted according to the downlink transmission gain, the transmission power is adjusted. Specifically, for example, the uplink transmission power increases according to an adjusted parameter that is adjusted according to the gain difference $G_T$ between the downlink transmission antenna gain and the uplink reception antenna gain. As an example, as described above, a value sent as the transmission power (parameter) of a CRS is adjusted to increase according to the gain difference $G_T$, resulting in an increase in the uplink transmission power. As a result, a decrease in uplink transmission quality can be reduced.

Note that the transmission power $P_{T\_CRS\_BF}$ of a CRS is an example of the DL adjusted parameter, and other parameters for calculating the uplink transmission power may be used as the DL adjusted parameter.

<4.3.3. Case 3>

Next, case 3 relating to beamforming will be described. As described above, in case 3, an uplink beamforming process, and a downlink beamforming process on a CRS, are both performed.

(Base Station 100-2: Information Acquisition Unit 161)
Parameters

In case 3, the above at least one adjusted parameter includes, for example, the above UL adjusted parameter and the above DL adjusted parameter.

As an example, the above UL adjusted parameter is the desired reception power $P_{O\_BF\_PUSCH,\ c}(j)$ of an uplink signal that is adjusted according to the uplink reception antenna gain in the case where an uplink beamforming process is performed. Also, the above DL adjusted parameter is the transmission power $P_{T\_CRS\_BF}$ of a CRS that is adjusted according to the downlink transmission antenna gain in the case where a downlink beamforming process is performed.

(Base Station 100-2: Communication Control Unit 163)
Execution of Beamforming Process In the third case, the communication control unit 163 performs an uplink beamforming process. Specifically, for example, the communication control unit 163 multiplies a received uplink signal by a weight coefficient for each antenna element.

In the third case, moreover, the communication control unit 163 performs a downlink beamforming process on a CRS. Specifically, for example, the communication control unit 163 multiplies a CRS by a weight coefficient weight coefficient for each antenna element. As a result, the CRS is transmitted using a directional beam (e.g., a three-dimensional beam).

Also, the communication control unit 163 performs a downlink beamforming process on, for example, a downlink signal that does not include a CRS (e.g., a data signal, any control signal, etc.). Specifically, for example, the communication control unit 163 multiplies the above downlink signal by a weight coefficient for each antenna element. As a result, the above downlink signal is transmitted using a directional beam (e.g., a three-dimensional beam).

(Terminal Apparatus 200-2: Information Acquisition Unit 271)
Parameters

In case 3, the above at least one adjusted parameter includes, for example, the above UL adjusted parameter and the above DL adjusted parameter. In other words, the information acquisition unit 271 of the terminal apparatus 200-2 acquires the above UL adjusted parameter and the above DL adjusted parameter.

(Terminal Apparatus 200-2: Communication Control Unit 273)
Calculation of Uplink Transmission Power In case 3, the communication control unit 273 of the terminal apparatus 200-2 calculates the uplink transmission power on the basis of the above one or more parameters including the above UL adjusted parameter and the above DL adjusted parameter.

As described above, the above UL adjusted parameter includes, for example, the desired reception power $P_{O\_BF\_PUSCH,\ c}(j)$ of an uplink signal that is adjusted according to the uplink reception antenna gain in the case where an uplink beamforming process is performed. Also, the above DL adjusted parameter includes, for example, the transmission power $P_{T\_CRS\_BF}$ of a CRS the downlink transmission antenna gain in the case where a downlink beamforming process is performed. Also, the above one or more parameters include, for example, the coefficient of an estimated value of the transmission loss in addition to the above UL adjusted parameter and the above DL adjusted parameter.

Initially, the communication control unit 273 estimates the downlink transmission loss $PL_C$ (dB) from, for example, the transmission power $P_{T\_CRS\_BF}$ of a CRS that is the above DL adjusted parameter, and the reception power $P_{R\_CRS}$ of a CRS measured by the terminal apparatus 200-2, as follows.

$$PL_c = P_{T\_CRS\_BF} - P_{R\_CRS} \quad [\text{Math. 25}]$$

Thereafter, the communication control unit 273 calculates the transmission power $P_{PUSCH,\ c}(i)$ (dBm) that is used by the terminal apparatus 200-2 for an uplink data channel in a sub-frame i, in a serving cell c, as follows.

$$P_{PUSCH,c}(i) = \min \left\{ \begin{array}{c} P_{CMAX,c}(i), \\ 10\log_{10}(M_{PUSCH,c}(i)) + P_{O\_BF\_PUSCH,c}(j) + \\ \alpha_c(j) \cdot PL_c + \Delta_{TF,c}(i) + f_c(i) \end{array} \right\} \quad [\text{Math. 26}]$$

$P_{CMAX,\ c}(i)$, $M_{PUSCH,\ c}(i)$, $\text{alpha}_c(j)$, $f_c(i)$, and $\text{delta}_{TF,\ c}(i)$ are as described in case 1.

As described above, in case 3, there is a risk that the uplink transmission power may be excessively high or insufficient. However, by the calculation of the uplink transmission power on the basis of an adjusted parameter that is adjusted according to the uplink reception gain and the downlink transmission gain, the transmission power is adjusted. Specifically, for example, the uplink transmission power decreases according to an adjusted parameter that is adjusted according to the gain difference $G_R$, and the uplink transmission power increases according to an adjusted parameter that is adjusted according to the gain difference $G_T$. As a result, the uplink transmission power is determined according to the gain difference between the uplink reception antenna gain and the downlink transmission antenna gain. Therefore, the uplink transmission power has an appropriate level. As a result, interference of an uplink signal with other signals and a decrease in uplink transmission quality can be reduced.

(Others)

Note that, in case 3, the above at least one adjusted parameter is not limited to an example in which the above at least one adjusted parameter includes the above UL adjusted parameter and the above DL adjusted parameter. The above at least one adjusted parameter may include a parameter that is adjusted according to the uplink reception antenna gain in the case where an uplink beamforming process is performed and the downlink transmission antenna gain in the case where a downlink beamforming process is performed (hereinafter referred to as an "UL/DL adjusted parameter"). In other words, the above at least one adjusted parameter may include the above UL/DL adjusted parameter instead of including the above UL adjusted parameter and the above DL adjusted parameter.

As an example, the above UL/DL adjusted parameter may be a parameter that is adjusted according to both the gain difference $G_R$ and the gain difference $G_T$. As another example, the above UL/DL adjusted parameter may be a parameter that is adjusted according to the gain difference $G_R{}'$ or the gain difference $G_T{}'$, which are described in the first embodiment. Each of the gain difference $G_R{}'$ and the gain difference $G_T{}'$ is the gain difference between the uplink reception antenna gain in the case where an uplink beamforming process is performed and the downlink transmission antenna gain in the case where a downlink beamforming process is performed.

Note that the above UL/DL adjusted parameter can be said to be the UL adjusted parameter and the DL adjusted parameter.

<<4.4. Flow of Process>>

Next, an example of a communication control process according to the second embodiment will be described with reference to FIG. 18 and FIG. 19.

(Communication Control Process in Base Station)

Figure 18:
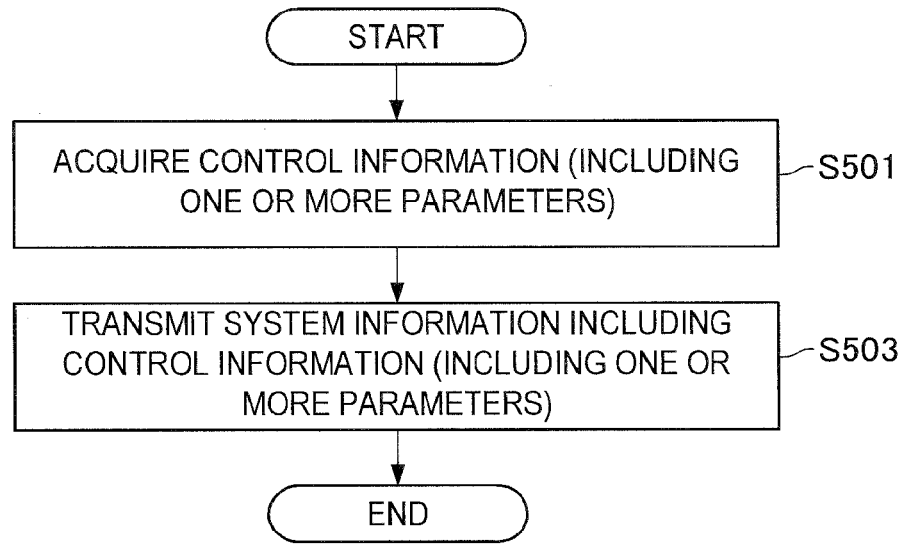
FIG. 18 is a flowchart showing an example of a schematic flow of a communication control process in a base station according to the second embodiment.

FIG. 18 is a flowchart showing an example of a schematic flow of a communication control process in a base station according to the second embodiment.

The information acquisition unit 161 acquires control information for determining the uplink transmission power (S501). In the second embodiment, the control information includes one or more parameters for calculating the uplink transmission power. Also, the above one or more parameters include at least one adjusted parameter that is adjusted according to the above antenna gain.

Thereafter, the base station 100-2 transmits system information including the above control information (including the above one or more parameters) to the terminal apparatus 200-2 under the control of the communication control unit 163 (S503).

(Communication Control Process in Terminal Apparatus)

Figure 19:
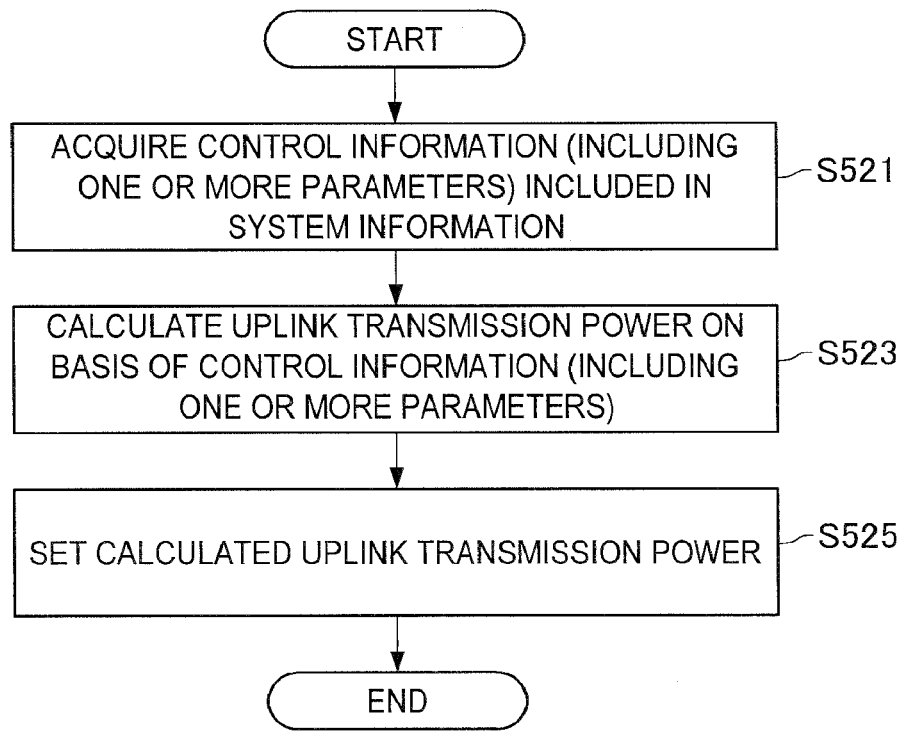
FIG. 19 is a flowchart showing an example of a schematic flow of a communication control process in a terminal apparatus according to the second embodiment.

FIG. 19 is a flowchart showing an example of a schematic flow of a communication control process in a terminal apparatus according to the second embodiment.

The information acquisition unit 271 acquires control information for determining the uplink transmission power that is included in system information (S521). In the second embodiment, the control information includes one or more parameters for calculating the uplink transmission power. Also, the above one or more parameters include one or more adjusted parameters that are adjusted according to the above antenna gain.

Thereafter, the communication control unit 273 calculates the uplink transmission power on the basis of the above control information including the above one or more parameters (S523).

Thereafter, the communication control unit 273 sets the calculated uplink transmission power (S525). Thereafter, the process ends.

In the foregoing, the second embodiment of the present disclosure has been described. According to the second embodiment, one or more parameters for calculating the uplink transmission power are transmitted by the base station 100-1 to the terminal apparatus 200-1. The one or more parameters include, in particular, at least one adjusted parameter that is adjusted according to the above antenna gain. Thereafter, the terminal apparatus 200-1 controls the uplink transmission power on the basis of the one or more parameters. As a result, for example, uplink transmission can be performed using appropriate transmission power in the case where a beamforming process is performed. Also, for example, an existing parameter for calculating an uplink signal (e.g., the desired reception power of an uplink signal, the transmission power of a CRS, etc.) may be adjusted and used, and therefore, a terminal apparatus may be able to perform uplink transmission using appropriate transmission power without an additional function. Also, it is not necessary for the base station 100-2 to transmit additional information to the terminal apparatus 200-2, and therefore, for example, an increase in overhead due to an increase in control signals can be avoided.

<<6. Application Examples>>

Technology according to the present disclosure is applicable to various products. For example, a base station 100 may be realized as any type of evolved Node B (eNB) such as a macro eNB, a small eNB. The small eNB may be an eNB that covers a cell smaller than a macro cell, such as a pico eNB, a micro eNB, a home (femto) eNB, or the like. Instead, the base station 100 may be realized as any other types of base stations such as a NodeB and a base transceiver station (BTS). The base station 100 may include a main body (that is also referred to as a base station apparatus) configured to control radio communication, and one or more remote radio heads (RRH) disposed in a different place from the main body. Also, various types of terminals described below may function as the base station 100 by temporarily or semi-permanently executing the functionality of the base station.

For example, a terminal apparatus 200 may be realized as a mobile terminal such as a smartphone, a tablet personal computer (PC), a notebook PC, a portable game terminal, a portable/dongle type mobile router, and a digital camera, or an in-vehicle terminal such as a car navigation apparatus. The terminal apparatus 200 may also be realized as a terminal (that is also referred to as a machine type communication (MTC) terminal) that performs machine-to-machine (M2M) communication. Furthermore, the terminal apparatus 200 may be a radio communication module (such as an integrated circuit module including a single die) mounted on each of the terminals.

<6.1. Application Examples Regarding Base Station>

(First Application Example)

Figure 20:
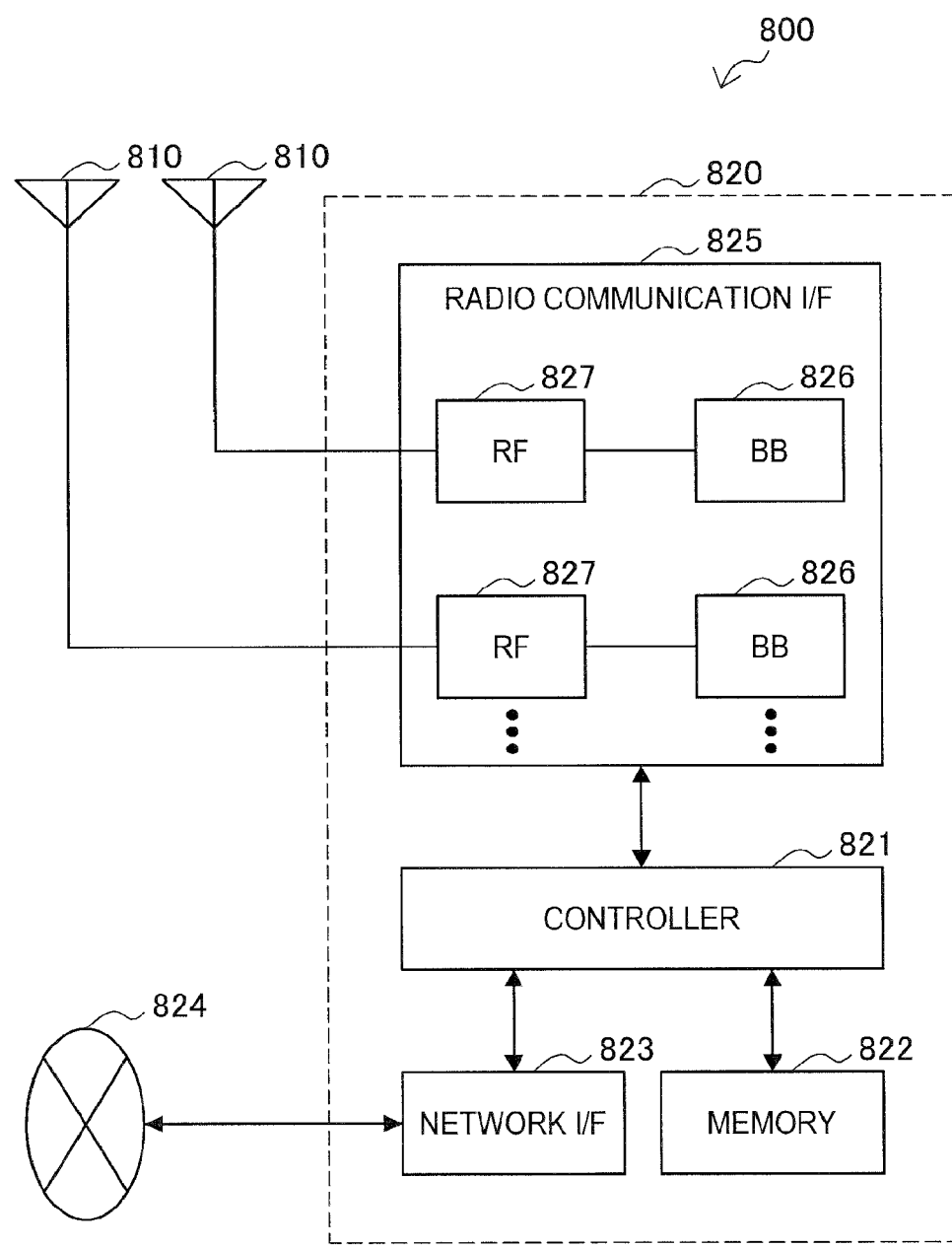
FIG. 20 is a block diagram illustrating a first example of a schematic configuration of an eNB to which the technology according to the present disclosure may be applied.

FIG. 20 is a block diagram illustrating a first example of a schematic configuration of an eNB to which the technology of the present disclosure may be applied. An eNB 800 includes one or more antennas 810 and a base station apparatus 820. Each antenna 810 and the base station apparatus 820 may be connected to each other via an RF cable.

Each of the antennas 810 includes a single or multiple antenna elements (such as multiple antenna elements included in an AMMO antenna), and is used for the base station apparatus 820 to transmit and receive radio signals. Particularly in the embodiment of the present disclosure, the at least one antenna 810 is a directional antenna capable of forming a directional (e.g. three-dimensional) beam. The eNB 800 may include the multiple antennas 810, as illustrated in FIG. 20. For example, the multiple antennas 810 may be compatible with multiple frequency bands used by the eNB 800. Although FIG. 20 illustrates the example in which the eNB 800 includes the multiple antennas 810, the eNB 800 may also include a single antenna 810.

The base station apparatus 820 includes a controller 821, a memory 822, a network interface 823, and a radio communication interface 825.

The controller 821 may be, for example, a CPU or a DSP, and operates various functions of a higher layer of the base station apparatus 820. For example, the controller 821 generates a data packet from data in signals processed by the radio communication interface 825, and transfers the generated packet via the network interface 823. The controller 821 may bundle data from multiple base band processors to generate the bundled packet, and transfer the generated bundled packet. The controller 821 may have logical functions of performing control such as radio resource control, radio bearer control, mobility management, admission control, and scheduling. The control may be performed in corporation with an eNB or a core network node in the vicinity. The memory 822 includes RAM and ROM, and stores a program that is executed by the controller 821, and various types of control data (such as a terminal list, transmission power data, and scheduling data).

The network interface 823 is a communication interface for connecting the base station apparatus 820 to a core network 824. The controller 821 may communicate with a core network node or another eNB via the network interface 823. In that case, the eNB 800, and the core network node or the other eNB may be connected to each other through a logical interface (such as an S1 interface and an X2 interface). The network interface 823 may also be a wired communication interface or a radio communication interface for radio backhaul. If the network interface 823 is a radio communication interface, the network interface 823 may use a higher frequency band for radio communication than a frequency band used by the radio communication interface 825.

The radio communication interface 825 supports any cellular communication scheme such as Long Term Evolution (LTE) and LTE-Advanced, and provides radio connection to a terminal positioned in a cell of the eNB 800 via the antenna 810. The radio communication interface 825 may typically include, for example, a baseband (BB) processor 826 and an RF circuit 827. The BB processor 826 may perform, for example, encoding/decoding, modulating/demodulating, and multiplexing/demultiplexing, and performs various types of signal processing of layers (such as L1, medium access control (MAC), radio link control (RLC), and a packet data convergence protocol (PDCP)). The BB processor 826 may have a part or all of the above-described logical functions instead of the controller 821. The BB processor 826 may be a memory that stores a communication control program, or a module that includes a processor and a related circuit configured to execute the program. Updating the program may allow the functions of the BB processor 826 to be changed. The module may be a card or a blade that is inserted into a slot of the base station apparatus 820. Alternatively, the module may also be a chip that is mounted on the card or the blade. Meanwhile, the RF circuit 827 may include, for example, a mixer, a filter, and an amplifier, and transmits and receives radio signals via the antenna 810.

The radio communication interface 825 may include the multiple BB processors 826, as illustrated in FIG. 20. For example, the multiple BB processors 826 may be compatible with multiple frequency bands used by the eNB 800. The radio communication interface 825 may include the multiple RF circuits 827, as illustrated in FIG. 20. For example, the multiple RF circuits 827 may be compatible with multiple antenna elements. Although FIG. 20 illustrates the example in which the radio communication interface 825 includes the multiple BB processors 826 and the multiple RF circuits 827, the radio communication interface 825 may also include a single BB processor 826 or a single RF circuit 827.

(Second Application Example)

Figure 21:
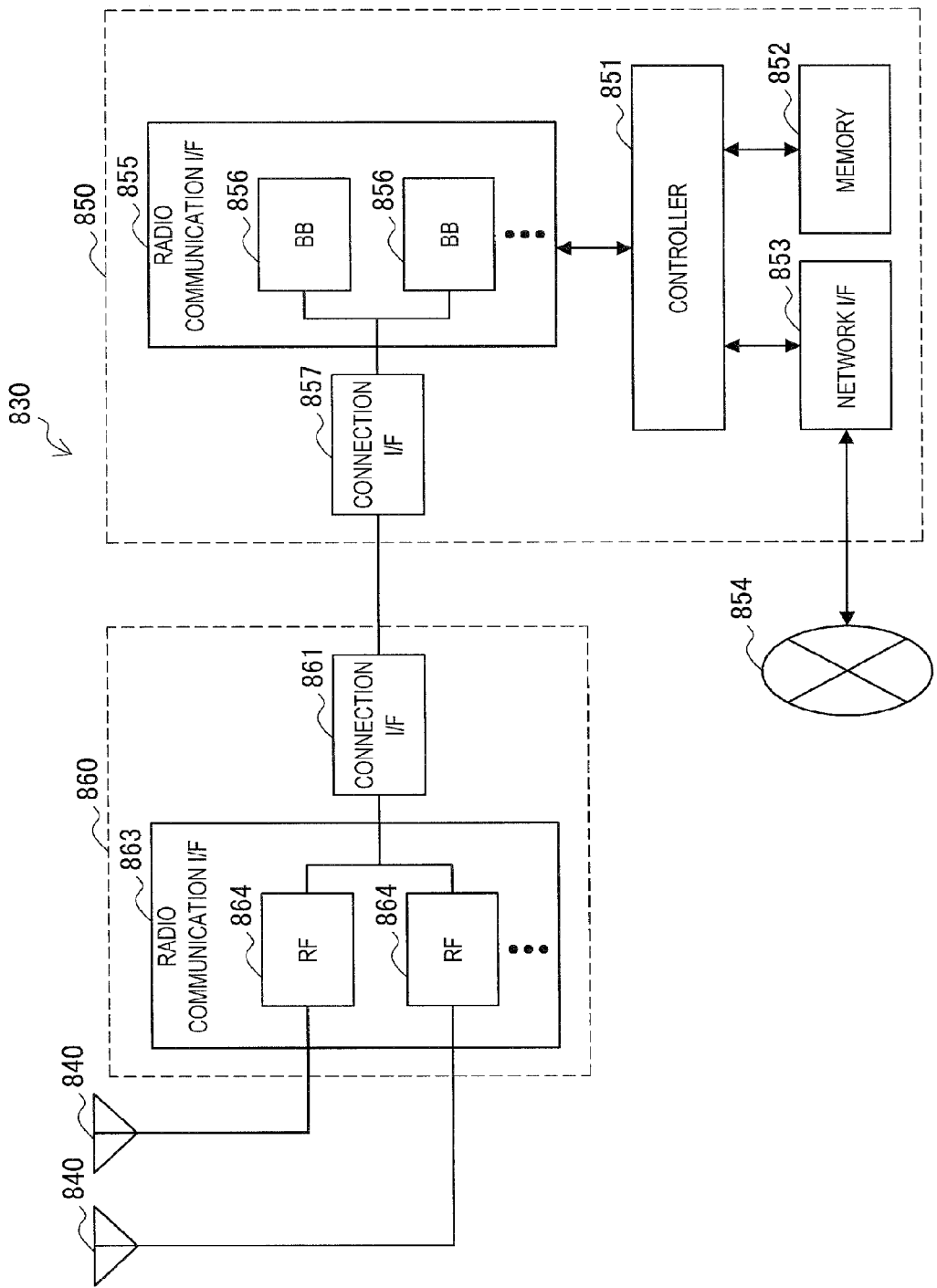
FIG. 21 is a block diagram illustrating a second example of a schematic configuration of an eNB to which the technology according to the present disclosure may be applied.

FIG. 21 is a block diagram illustrating a second example of a schematic configuration of an eNB to which the technology of the present disclosure may be applied. An eNB 830 includes one or more antennas 840, a base station apparatus 850, and an RRH 860. Each antenna 840 and the RRH 860 may be connected to each other via an RF cable. The base station apparatus 850 and the RRH 860 may be connected to each other via a high speed line such as an optical fiber cable.

Each of the antennas 840 includes a single or multiple antenna elements (such as multiple antenna elements included in an MIMO antenna), and is used for the RRH 860 to transmit and receive radio signals. Particularly in the embodiment of the present disclosure, the at least one antenna 840 is a directional antenna capable of forming a directional (e.g. three-dimensional) beam. The eNB 830 may include the multiple antennas 840, as illustrated in FIG. 21. For example, the multiple antennas 840 may be compatible with multiple frequency bands used by the eNB 830. Although FIG. 21 illustrates the example in which the eNB 830 includes the multiple antennas 840, the eNB 830 may also include a single antenna 840.

The base station apparatus 850 includes a controller 851, a memory 852, a network interface 853, a radio communication interface 855, and a connection interface 857. The controller 851, the memory 852, and the network interface 853 are the same as the controller 821, the memory 822, and the network interface 823 described with reference to FIG. 20.

The radio communication interface 855 supports any cellular communication scheme such as LTE and LTE-Advanced, and provides radio communication to a terminal positioned in a sector corresponding to the RRH 860 via the RRH 860 and the antenna 840. The radio communication interface 855 may typically include, for example, a BB processor 856. The BB processor 856 is the same as the BB processor 826 described with reference to FIG. 20, except the BB processor 856 is connected to the RF circuit 864 of the RRH 860 via the connection interface 857. The radio communication interface 855 may include the multiple BB processors 856, as illustrated in FIG. 21. For example, the multiple BB processors 856 may be compatible with multiple frequency bands used by the eNB 830. Although FIG. 21 illustrates the example in which the radio communication interface 855 includes the multiple BB processors 856, the radio communication interface 855 may also include a single BB processor 856.

The connection interface 857 is an interface for connecting the base station apparatus 850 (radio communication interface 855) to the RRH 860. The connection interface 857 may also be a communication module for communication in the above-described high speed line that connects the base station apparatus 850 (radio communication interface 855) to the RRH 860.

The RRH 860 includes a connection interface 861 and a radio communication interface 863.

The connection interface 861 is an interface for connecting the RRH 860 (radio communication interface 863) to the base station apparatus 850. The connection interface 861 may also be a communication module for communication in the above-described high speed line.

The radio communication interface 863 transmits and receives radio signals via the antenna 840. The radio communication interface 863 may typically include, for example, the RF circuit 864. The RF circuit 864 may include, for example, a mixer, a filter, and an amplifier, and transmits and receives radio signals via the antenna 840. The radio communication interface 863 may include multiple RF circuits 864, as illustrated in FIG. 21. For example, the multiple RF circuits 864 may support multiple antenna elements. Although FIG. 21 illustrates the example in which the radio communication interface 863 includes the multiple RF circuits 864, the radio communication interface 863 may also include a single RF circuit 864.

In the eNB 800 and the eNB 830 shown in FIG. 20 and FIG. 21, the information acquisition unit 151 and the communication control unit 153 that are described with reference to FIG. 12, and the information acquisition unit 161 and the communication control unit 163 that are described with reference to FIG. 16 may be provided in the radio communication interface 825 and the radio communication interface 855 and/or the radio communication interface 863. Also, at least a portion of these functions may be achieved by the controller 821 and the controller 851.

<6.2. Application Examples Regarding Terminal Apparatus>

(First Application Example)

Figure 22:
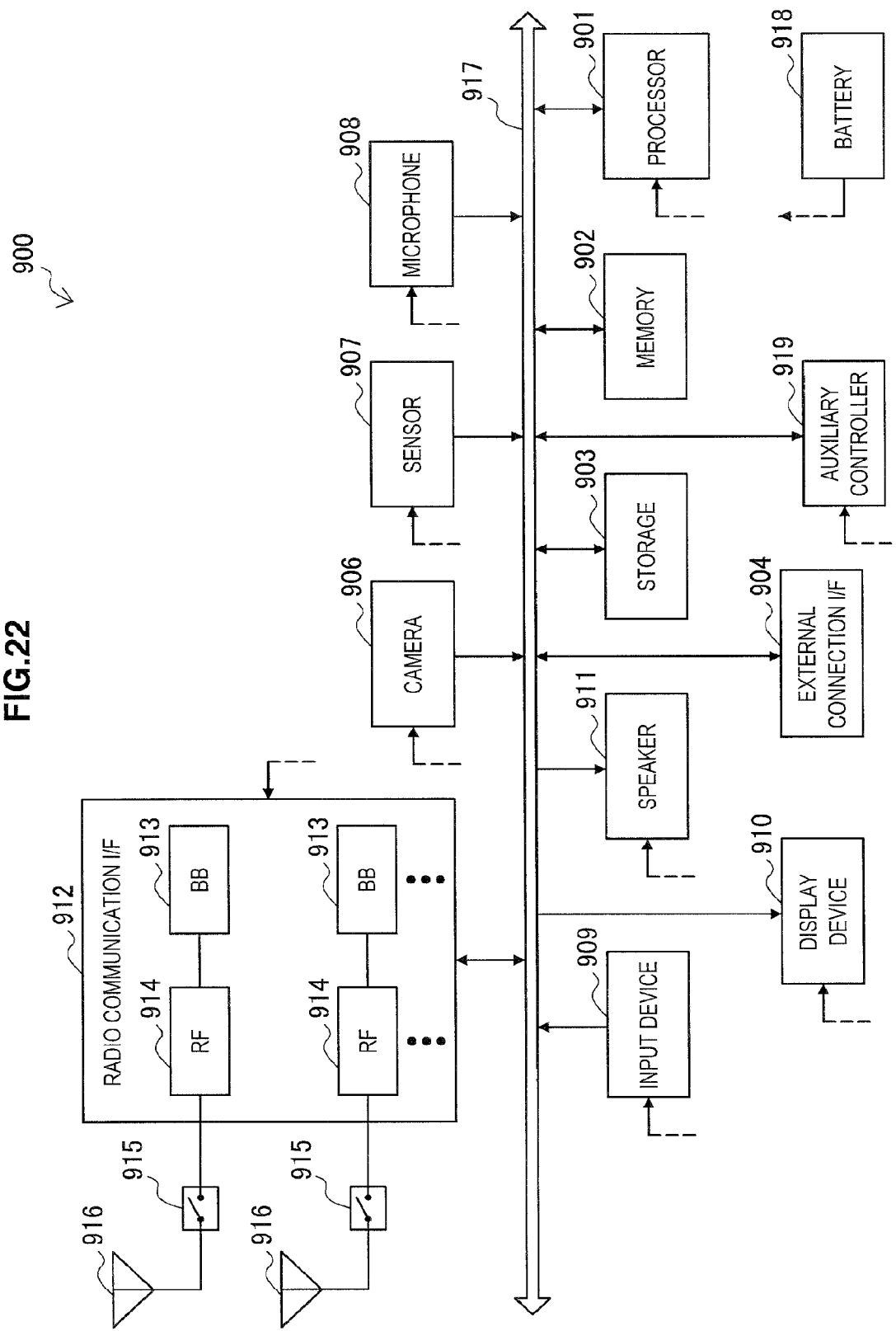
FIG. 22 is a block diagram illustrating an example of a schematic configuration of a smartphone to which the technology according to the present disclosure may be applied.

FIG. 22 is a block diagram illustrating an example of a schematic configuration of a smartphone 900 to which the technology of the present disclosure may be applied. The smartphone 900 includes a processor 901, a memory 902, a storage 903, an external connection interface 904, a camera 906, a sensor 907, a microphone 908, an input device 909, a display device 910, a speaker 911, a radio communication interface 912, one or more antenna switches 915, one or more antennas 916, a bus 917, a battery 918, and an auxiliary controller 919.

The processor 901 may be, for example, a CPU or a system on a chip (SoC), and controls functions of an application layer and another layer of the smartphone 900. The memory 902 includes RAM and ROM, and stores a program that is executed by the processor 901, and data. The storage 903 may include a storage medium such as a semiconductor memory and a hard disk. The external connection interface 904 is an interface for connecting an external device such as a memory card and a universal serial bus (USB) device to the smartphone 900.

The camera 906 includes an image sensor such as a charge coupled device (CCD) and a complementary metal oxide semiconductor (CMOS), and generates a captured image. The sensor 907 may include a group of sensors such as a measurement sensor, a gyro sensor, a geomagnetic sensor, and an acceleration sensor. The microphone 908 converts sounds that are input to the smartphone 900 to audio signals. The input device 909 includes, for example, a touch sensor configured to detect touch onto a screen of the display device 910, a keypad, a keyboard, a button, or a switch, and receives an operation or an information input from a user. The display device 910 includes a screen such as a liquid crystal display (LCD) and an organic light-emitting diode (OLED) display, and displays an output image of the smartphone 900. The speaker 911 converts audio signals that are output from the smartphone 900 to sounds.

The radio communication interface 912 supports any cellular communication scheme such as LTE and LTE-Advanced, and performs radio communication. The radio communication interface 912 may typically include, for example, a BB processor 913 and an RF circuit 914. The BB processor 913 may perform, for example, encoding/decoding, modulating/demodulating, and multiplexing/demultiplexing, and performs various types of signal processing for radio communication. Meanwhile, the RF circuit 914 may include, for example, a mixer, a filter, and an amplifier, and transmits and receives radio signals via the antenna 916. The radio communication interface 912 may also be a one chip module that has the BB processor 913 and the RF circuit 914 integrated thereon. The radio communication interface 912 may include the multiple BB processors 913 and the multiple RF circuits 914, as illustrated in FIG. 22. Although FIG. 22 illustrates the example in which the radio communication interface 912 includes the multiple BB processors 913 and the multiple RF circuits 914, the radio communication interface 912 may also include a single BB processor 913 or a single RF circuit 914.

Furthermore, in addition to a cellular communication scheme, the radio communication interface 912 may support another type of radio communication scheme such as a short-distance radio communication scheme, a near field communication scheme, and a radio local area network (LAN) scheme. In that case, the radio communication interface 912 may include the BB processor 913 and the RF circuit 914 for each radio communication scheme.

Each of the antenna switches 915 switches connection destinations of the antennas 916 among multiple circuits (such as circuits for different radio communication schemes) included in the radio communication interface 912.

Each of the antennas 916 includes a single or multiple antenna elements (such as multiple antenna elements included in an MIMO antenna), and is used for the radio communication interface 912 to transmit and receive radio signals. The smartphone 900 may include the multiple antennas 916, as illustrated in FIG. 22. Although FIG. 22 illustrates the example in which the smartphone 900 includes the multiple antennas 916, the smartphone 900 may also include a single antenna 916.

Furthermore, the smartphone 900 may include the antenna 916 for each radio communication scheme. In that case, the antenna switches 915 may be omitted from the configuration of the smartphone 900.

The bus 917 connects the processor 901, the memory 902, the storage 903, the external connection interface 904, the camera 906, the sensor 907, the microphone 908, the input device 909, the display device 910, the speaker 911, the radio communication interface 912, and the auxiliary controller 919 to each other. The battery 918 supplies power to blocks of the smartphone 900 illustrated in FIG. 22 via feeder lines, which are partially shown as dashed lines in the figure. The auxiliary controller 919 operates a minimum necessary function of the smartphone 900, for example, in a sleep mode.

In the smartphone 900 shown in FIG. 22, the information acquisition unit 261 and the communication control unit 263 that are described with reference to FIG. 13, and the information acquisition unit 271 and the communication control unit 273 that are described with reference to FIG. 17 may be provided in the radio communication interface 912. Also, at least a portion of these functions may be achieved by the processor 901 or the auxiliary controller 919.

(Second Application Example)

Figure 23:
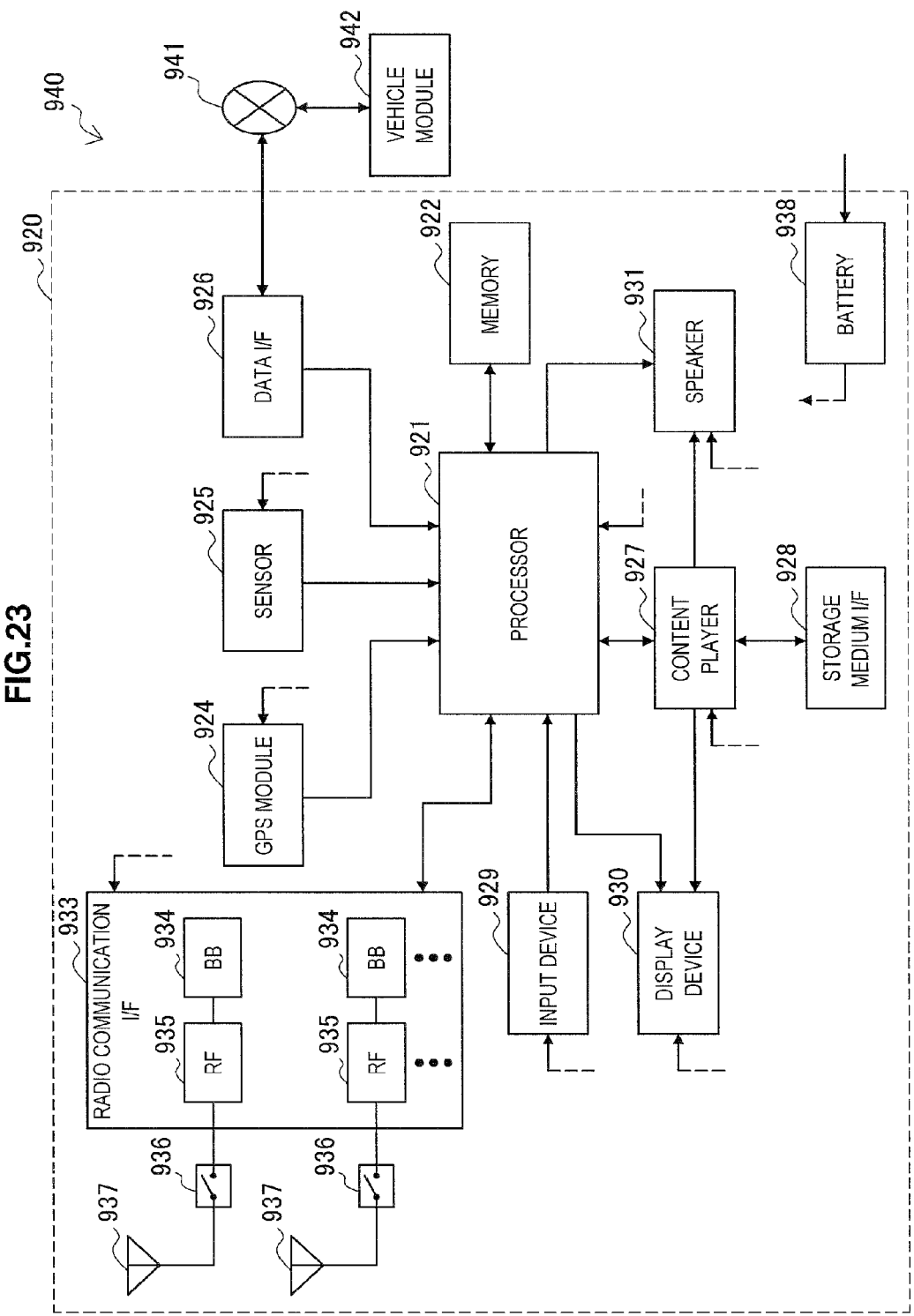
FIG. 23 is a block diagram illustrating an example of a schematic configuration of a car navigation apparatus to which the technology according to the present disclosure may be applied.

FIG. 23 is a block diagram illustrating an example of a schematic configuration of a car navigation apparatus 920 to which the technology of the present disclosure may be applied. The car navigation apparatus 920 includes a processor 921, a memory 922, a global positioning system (GPS) module 924, a sensor 925, a data interface 926, a content player 927, a storage medium interface 928, an input device 929, a display device 930, a speaker 931, a radio communication interface 933, one or more antenna switches 936, one or more antennas 937, and a battery 938.

The processor 921 may be, for example, a CPU or a SoC, and controls a navigation function and another function of the car navigation apparatus 920. The memory 922 includes RAM and ROM, and stores a program that is executed by the processor 921, and data.

The GPS module 924 uses GPS signals received from a GPS satellite to measure a position (such as latitude, longitude, and altitude) of the car navigation apparatus 920. The sensor 925 may include a group of sensors such as a gyro sensor, a geomagnetic sensor, and an air pressure sensor. The data interface 926 is connected to, for example, an in-vehicle network 941 via a terminal that is not shown, and acquires data generated by the vehicle, such as vehicle speed data.

The content player 927 reproduces content stored in a storage medium (such as a CD and a DVD) that is inserted into the storage medium interface 928. The input device 929 includes, for example, a touch sensor configured to detect touch onto a screen of the display device 930, a button, or a switch, and receives an operation or an information input from a user. The display device 930 includes a screen such as a LCD or an OLED display, and displays an image of the navigation function or content that is reproduced. The speaker 931 outputs sounds of the navigation function or the content that is reproduced.

The radio communication interface 933 supports any cellular communication scheme such as LET and LTE-Advanced, and performs radio communication. The radio communication interface 933 may typically include, for example, a BB processor 934 and an RF circuit 935. The BB processor 934 may perform, for example, encoding/decoding, modulating/demodulating, and multiplexing/demultiplexing, and performs various types of signal processing for radio communication. Meanwhile, the RF circuit 935 may include, for example, a mixer, a filter, and an amplifier, and transmits and receives radio signals via the antenna 937. The radio communication interface 933 may be a one chip module having the BB processor 934 and the RF circuit 935 integrated thereon. The radio communication interface 933 may include the multiple BB processors 934 and the multiple RF circuits 935, as illustrated in FIG. 23. Although FIG. 23 illustrates the example in which the radio communication interface 933 includes the multiple BB processors 934 and the multiple RF circuits 935, the radio communication interface 933 may also include a single BB processor 934 or a single RF circuit 935.

Furthermore, in addition to a cellular communication scheme, the radio communication interface 933 may support another type of radio communication scheme such as a short-distance radio communication scheme, a near field communication scheme, and a radio LAN scheme. In that case, the radio communication interface 933 may include the BB processor 934 and the RF circuit 935 for each radio communication scheme.

Each of the antenna switches 936 switches connection destinations of the antennas 937 among multiple circuits (such as circuits for different radio communication schemes) included in the radio communication interface 933.

Each of the antennas 937 includes a single or multiple antenna elements (such as multiple antenna elements included in an MIMO antenna), and is used for the radio communication interface 933 to transmit and receive radio signals. The car navigation apparatus 920 may include the multiple antennas 937, as illustrated in FIG. 23. Although FIG. 23 illustrates the example in which the car navigation apparatus 920 includes the multiple antennas 937, the car navigation apparatus 920 may also include a single antenna 937.

Furthermore, the car navigation apparatus 920 may include the antenna 937 for each radio communication scheme. In that case, the antenna switches 936 may be omitted from the configuration of the car navigation apparatus 920.

The battery 938 supplies power to blocks of the car navigation apparatus 920 illustrated in FIG. 23 via feeder lines that are partially shown as dashed lines in the figure. The battery 938 accumulates power supplied form the vehicle.

In the car navigation apparatus 920 shown in FIG. 23, the information acquisition unit 261 and the communication control unit 263 that are described with reference to FIG. 13, and the information acquisition unit 271 and the communication control unit 273 that are described with reference to FIG. 17 may be provided in the radio communication interface 933. Also, at least a portion of these functions may be achieved by the processor 921.

The technology of the present disclosure may also be realized as an in-vehicle system (or a vehicle) 940 including one or more blocks of the car navigation apparatus 920, the in-vehicle network 941, and a vehicle module 942. The vehicle module 942 generates vehicle data such as vehicle speed, engine speed, and trouble information, and outputs the generated data to the in-vehicle network 941.

<<<6. Conclusion>>>

In the foregoing, communication apparatuses and processes according to embodiments of the present disclosure have been described with reference to FIG. 1 to FIG. 23. According to an embodiment of the present disclosure, the information acquisition unit 151 acquires control information for determining the uplink transmission power, and the communication control unit 153 controls transmission of the above control information to the terminal apparatus 200-1. The above control information includes adjustment information for adjusting the transmission power according to the antenna gain in the case where a beamforming process is performed.

As a result, uplink transmission can be performed using appropriate transmission power in the case where a beamforming process is performed.

First Embodiment

In particular, in the first embodiment, the control information includes, as the above adjustment information, gain-related information about the antenna gain in the case where a beamforming process is performed.

For example, the above gain-related information includes information about the uplink reception antenna gain in the case where an uplink beamforming process is performed (i.e., the UL gain-related information).

As described above, for example, in case 1, an uplink beamforming process is performed, and therefore, there is a risk that the uplink transmission power may be excessively high. However, by the calculation of the uplink transmission power on the basis of the UL gain-related information (e.g., the gain difference $G_R$), the transmission power is adjusted. Specifically, for example, the uplink transmission power decreases according to the gain difference $G_R$. As a result, interference of an uplink signal with other signals can be reduced.

Also, for example, the above gain-related information includes information about the downlink transmission antenna gain in the case where a downlink beamforming process is performed (i.e., the DL gain-related information).

As described above, for example, in case 2, a downlink beamforming process is performed on a CRS, and therefore, there is a risk that the uplink transmission power may be insufficient. However, by the calculation of the uplink transmission power on the basis of the above DL gain-related information (e.g., the gain difference $G_T$), the transmission power is adjusted. Specifically, for example, the uplink transmission power increases according to the gain difference $G_T$. As an example, as described above, the value of the transmission loss increases according to the gain difference $G_T$, resulting in an increase in the uplink transmission power. As a result, a decrease in uplink transmission quality can be reduced.

Also, for example, the above gain-related information includes information about the uplink reception antenna gain in the case where an uplink beamforming process is performed and the downlink transmission antenna gain in the case where a downlink beamforming process is performed (i.e., the UL/DL gain-related information). The UL/DL gain-related information can be said to be the UL gain-related information and the DL gain-related information.

As described above, for example, in case 3, there is a risk that the uplink transmission power may be excessively high or insufficient. However, by the calculation of the uplink transmission power on the basis of the above UL/DL gain-related information (e.g., the gain difference $G_R$ and the gain difference $G_T$), the transmission power is adjusted. Specifically, for example, the uplink transmission power decreases according to the gain difference $G_R$, and the uplink transmission power increases according to the gain difference $G_T$, and therefore, the uplink transmission power is determined according to the difference between the uplink reception antenna gain and the downlink transmission antenna gain. Therefore, the uplink transmission power has an appropriate level. As a result, interference of an uplink signal with other signals and a decrease in uplink transmission quality can be reduced.

Also, for example, the communication control unit 153 controls transmission of the above gain-related information to the terminal apparatus 200-1 so that the above gain-related information is transmitted as a portion of system information using a directional beam.

Such transmission of the above gain-related information using a directional beam allows for, for example, transmission of different pieces of gain-related information using different directional beams. Therefore, even when different antenna gains are used for different directional beams, appropriate gain-related information corresponding to the directional beam can be reported to the terminal apparatus 200-1.

Second Embodiment

The above control information includes one or more parameters for calculating the uplink transmission power, and includes, as the above adjustment information, at least one adjusted parameter that is adjusted according to the above antenna gain, of the one or more parameters.

As a result, for example, an existing parameter for calculating an uplink signal (e.g., the desired reception power of an uplink signal, the transmission power of a CRS, etc.) may be adjusted and used, and therefore, a terminal apparatus may be able to perform uplink transmission using appropriate transmission power without an additional function. Also, it is not necessary for the base station 100-2 to transmit additional information to the terminal apparatus 200-2, and therefore, for example, an increase in overhead due to an increase in control signals can be avoided.

For example, the above at least one adjusted parameter includes a parameter that is adjusted according to the uplink reception antenna gain in the case where an uplink beamforming process is performed (i.e., the UL adjusted parameter).

As described above, for example, in case 1, an uplink beamforming process is performed, and therefore, there is a risk that the uplink transmission power may be excessively high. However, by the calculation of the uplink transmission power on the basis of an adjusted parameter that is adjusted according to the uplink reception gain, the transmission power is adjusted. Specifically, for example, the uplink transmission power decreases according to an adjusted parameter that is adjusted according to the gain difference $G_R$ between the uplink reception antenna gain and the downlink transmission antenna gain. As an example, as described above, a value sent as the desired uplink reception power (parameter) is adjusted to decrease according to the gain difference $G_R$, resulting in a decrease in the uplink transmission power. As a result, interference of an uplink signal with other signals can be reduced.

Also, for example, the above at least one adjusted parameter includes a parameter that is adjusted according to the downlink transmission antenna gain in the case where a downlink beamforming process is performed (i.e., the DL adjusted parameter).

As described above, for example, in case 2, a downlink beamforming process is performed on a CRS, and therefore, there is a risk that the uplink transmission power may be insufficient. However, by the calculation of the uplink transmission power on the basis of an adjusted parameter that is adjusted according to the downlink transmission gain, the transmission power is adjusted. Specifically, for example, the uplink transmission power increases according to an adjusted parameter that is adjusted according to the gain difference $G_T$ between the downlink transmission antenna gain and the uplink reception antenna gain. As an example, as described above, a value sent as the transmission power (parameter) of a CRS is adjusted to increase according to the gain difference $G_T$, resulting in an increase in the uplink transmission power. As a result, a decrease in uplink transmission quality can be reduced.

Also, for example, the above at least one adjusted parameter includes the above UL adjusted parameter and the above DL adjusted parameter. Alternatively, the above at least one adjusted parameter may include a parameter that is adjusted according to the uplink reception antenna gain in the case where an uplink beamforming process is performed and the downlink transmission antenna gain in the case where a downlink beamforming process is performed (i.e., the UL/DL adjusted parameter). The UL/DL adjusted parameter can be said to be the UL adjusted parameter and the DL adjusted parameter.

As described above, for example, in case 3, there is a risk that the uplink transmission power may be excessively high or insufficient. However, by the calculation of the uplink transmission power on the basis of an adjusted parameter that is adjusted according to the uplink reception gain and the downlink transmission gain, the transmission power is adjusted. Specifically, for example, power corresponding to the gain difference $G_R$ is subtracted from the uplink transmission power, and power corresponding to the gain difference $G_T$ is added to the uplink transmission power. As a result, the uplink transmission power is determined according to the gain difference between the uplink reception antenna gain and the downlink transmission antenna gain. Therefore, the uplink transmission power has an appropriate level. As a result, interference of an uplink signal with other signals and a decrease in uplink transmission quality can be reduced.

Also, for example, the communication control unit 163 controls transmission of the above at least one adjusted parameter to the terminal apparatus 200-2 so that the above at least one adjusted parameter that is adjusted according to the above antenna gain is transmitted as a portion of system information using a directional beam.

Such transmission of the above at least one adjusted parameter using a directional beam allows for, for example, transmission of different parameters (parameters adjusted according to the antenna gain) using different directional beams. Therefore, even when different antenna gains are used for different directional beams or the above at least one adjusted parameter (e.g., the transmission power of a CRS) is changed for each directional beam, appropriate parameter information corresponding to the directional beam can be reported to the terminal apparatus 200-2.

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

Although, for example, an example in which a downlink signal is transmitted to not only a directional area but also a non-directional area has been described, the present disclosure is not limited to this example. For example, in case 2 and case 3, a downlink signal may not be transmitted to a non-directional area. In other words, a downlink signal may be transmitted using a directional beam instead of being transmitted using radio waves generated without beamforming.

Also, although an example in which a directional beam is formed has been described, the directional beam may be formed for each terminal apparatus. In other words, weight coefficients for forming a directional beam may be determined for each terminal apparatus. As a specific example, in case 1, case 2, and case 3, a directional beam may be formed for each terminal apparatus. Alternatively, the above directional beam may be formed for each virtual cell. In other words, weight coefficients for forming a directional beam may be determined for each virtual cell instead of for each terminal apparatus. As a specific example, in case 2 and case 3, a directional beam may be formed for each terminal apparatus.

Also, an example in which the communication system complies with LTE, LTE-Advanced, or other similar communication schemes, has been described. The present disclosure is not limited to such an example. For example, the communication system may comply with other communication standards.

Also, the processing steps in a communication control process in this specification are not strictly limited to being executed in a time series following the sequence described in a flowchart. For example, the processing steps in a communication control process may be executed in a sequence that differs from a sequence described herein as a flowchart, and furthermore may be executed in parallel.

In addition, it is possible to create a computer program for causing hardware such as a CPU, ROM, and RAM built into a communication control device (a base station device, for example) or a terminal apparatus to exhibit functions similar to each structural element of the foregoing communication control device or the foregoing terminal apparatus. Also, a storage medium having such a computer program stored therein may also be provided. Also, an information processing device (for example, a processing circuit or chip) equipped with memory storing such a computer program (for example, ROM and RAM) and one or more processors that may execute such a computer program (a CPU, a DSP, for example) may also be provided.

In addition, the effects described in the present specification are merely illustrative and demonstrative, and not limitative. In other words, the technology according to the present disclosure can exhibit other effects that are evident to those skilled in the art along with or instead of the effects based on the present specification.

Additionally, the present technology may also be configured as below.

(1)
A communication control apparatus including:
an acquisition unit configured to acquire control information for determining uplink transmission power; and
a communication control unit configured to control transmission of the control information to a terminal apparatus,
wherein the control information includes adjustment information for adjusting transmission power according to an antenna gain in a case where a beamforming process is performed.

(2)
The communication control apparatus according to (1),
wherein the control information includes, as the adjustment information, gain-related information about the antenna gain in the case where the beamforming process is performed.

(3)
The communication control apparatus according to (2),
wherein the gain-related information includes information about an uplink reception antenna gain in a case where an uplink beamforming process is performed.

(4)
The communication control apparatus according to (3),
wherein the information about the reception antenna gain includes information indicating a difference between the reception antenna gain and a downlink transmission antenna gain.

(5)
The communication control apparatus according to (3),
wherein the information about the reception antenna gain includes information indicating the reception antenna gain.

(6)
The communication control apparatus according to (5),
wherein the information about the reception antenna gain is information indicating the number of antenna elements corresponding to the uplink beamforming process.

(7)
The communication control apparatus according to any one of (2) to (6),
wherein the gain-related information includes information about a downlink transmission antenna gain in a case where a downlink beamforming process is performed.

(8)
The communication control apparatus according to (7),
wherein the information about the transmission antenna gain includes information indicating a difference between the transmission antenna gain and an uplink reception antenna gain.

(9)
The communication control apparatus according to (7),
wherein the information about the transmission antenna gain includes information indicating the transmission antenna gain or information for calculating the transmission antenna gain.

(10)
The communication control apparatus according to (9),
wherein the information for calculating the transmission antenna gain is information indicating the number of antenna elements corresponding to the downlink beamforming process.

(11)
The communication control apparatus according to any one of (2) to (10),
wherein the communication control unit controls transmission of the gain-related information to the terminal apparatus so that the gain-related information is transmitted as a portion of system information using a directional beam.

(12)
The communication control apparatus according to (1),
wherein the control information includes one or more parameters for calculating the uplink transmission power, and includes, as the adjustment information, at least one adjusted parameter that is adjusted according to the antenna gain, of the one or more parameters.

(13)

The communication control apparatus according to (12), wherein the at least one adjusted parameter includes at least one of desired reception power of an uplink signal and transmission power of a reference signal.

(14)

The communication control apparatus according to (12) or (13), wherein the at least one adjusted parameter includes a parameter that is adjusted according to an uplink reception antenna gain in a case where an uplink beamforming process is performed.

(15)

The communication control apparatus according to any one of (12) to (14), wherein the at least one adjusted parameter includes a parameter that is adjusted according to a downlink transmission antenna gain in a case where a downlink beamforming process is performed.

(16)

The communication control apparatus according to any one of (12) to (15), wherein the communication control unit controls transmission of the at least one adjusted parameter to the terminal apparatus so that the at least one adjusted parameter is transmitted as a portion of system information using a directional beam.

(17)

A communication control method including:

acquiring control information for determining uplink transmission power; and controlling, by a processor, transmission of the control information to a terminal apparatus, wherein the control information includes adjustment information for adjusting the transmission power according to an antenna gain in a case where a beamforming process is performed.

(18)

A terminal apparatus including:

an acquisition unit configured to acquire control information for determining uplink transmission power; and a communication control unit configured to control the uplink transmission power on the basis of the control information, wherein the control information includes gain-related information about an antenna gain in a case where a beamforming process is performed.

(19)

A communication control method including:

acquiring control information for determining uplink transmission power; and controlling, by a processor, the uplink transmission power on the basis of the control information, wherein the control information includes gain-related information about an antenna gain in a case where a beamforming process is performed.

(20)

An information processing apparatus including:

a memory configured to store a program; and one or more processors configured to be able to execute the program, wherein the program executes acquiring control information for determining uplink transmission power, and controlling the uplink transmission power on the basis of the control information, and wherein the control information includes gain-related information about an antenna gain in a case where a beamforming process is performed.

REFERENCE SIGNS LIST 1 communication system
10 cell
20 three-dimensional beam
30 communication region
100 base station
151, 161 information acquisition unit
153, 163 communication control unit
200 terminal apparatus
261, 261 information acquisition unit
273, 273 communication control unit

The invention claimed is:

1. A communication control apparatus comprising:
circuitry configured to
determine control information for determining uplink transmission power in accordance with a beamforming process to be performed; and
control transmission of the control information to a terminal apparatus,
wherein the control information includes adjustment information for adjusting the uplink transmission power according to an antenna gain difference between the communication control apparatus and the terminal apparatus in a case where the beamforming process is performed.

2. The communication control apparatus according to claim 1,
wherein the control information includes, as the adjustment information, gain-related information about the antenna gain difference in the case where the beamforming process is performed.

3. The communication control apparatus according to claim 2,
wherein the gain-related information includes information about an uplink reception antenna gain in a case where an uplink beamforming process is performed.

4. The communication control apparatus according to claim 3,
wherein the information about the reception antenna gain includes information indicating a difference between the reception antenna gain and a downlink transmission antenna gain.

5. The communication control apparatus according to claim 3,
wherein the information about the reception antenna gain includes information indicating the reception antenna gain.

6. The communication control apparatus according to claim 5,
wherein the information about the reception antenna gain is information indicating the number of antenna elements corresponding to the uplink beamforming process.

7. The communication control apparatus according to claim 2,
wherein the gain-related information includes information about a downlink transmission antenna gain in a case where a downlink beamforming process is performed.

8. The communication control apparatus according to claim 7, wherein the information about the transmission antenna gain includes information indicating a difference between the transmission antenna gain and an uplink reception antenna gain.

9. The communication control apparatus according to claim 7,
wherein the information about the transmission antenna gain includes information indicating the transmission antenna gain or information for calculating the transmission antenna gain.

10. The communication control apparatus according to claim 9,
wherein the information for calculating the transmission antenna gain is information indicating the number of antenna elements corresponding to the downlink beamforming process.

11. The communication control apparatus according to claim 2,
wherein the circuitry is configured to control transmission of the gain-related information to the terminal apparatus so that the gain-related information is transmitted as a portion of system information using a directional beam.

12. The communication control apparatus according to claim 1,
wherein the control information includes one or more parameters for calculating the uplink transmission power, and includes, as the adjustment information, at least one adjusted parameter that is adjusted according to the antenna gain, of the one or more parameters.

13. The communication control apparatus according to claim 12,
wherein the at least one adjusted parameter includes at least one of desired reception power of an uplink signal and transmission power of a reference signal.

14. The communication control apparatus according to claim 12,
wherein the at least one adjusted parameter includes a parameter that is adjusted according to an uplink reception antenna gain in a case where an uplink beamforming process is performed.

15. The communication control apparatus according to claim 12,
wherein the at least one adjusted parameter includes a parameter that is adjusted according to a downlink transmission antenna gain in a case where a downlink beamforming process is performed.

16. The communication control apparatus according to claim 12,
wherein the circuitry is configured to control transmission of the at least one adjusted parameter to the terminal apparatus so that the at least one adjusted parameter is transmitted as a portion of system information using a directional beam.

17. A communication control method comprising:
determining control information for determining uplink transmission power in accordance with a beamforming process to be performed; and
controlling, by a processor, transmission of the control information to a terminal apparatus,
wherein the control information includes adjustment information for adjusting the uplink transmission power according to an antenna gain difference between a communication control apparatus including the processor and the terminal apparatus in a case where the beamforming process is performed.

18. A terminal apparatus comprising:
circuitry configured to
acquire control information for determining uplink transmission power in accordance with a beamforming process to be performed; and
control the uplink transmission power on the basis of the control information,
wherein the control information includes gain-related information about an antenna gain difference between a communication control apparatus from which the control information is acquired and the terminal apparatus in a case where the beamforming process is performed.

19. A communication control method comprising:
acquiring control information for determining uplink transmission power in accordance with a beamforming process to be performed; and
controlling, by a processor, the uplink transmission power on the basis of the control information,
wherein the control information includes gain-related information about an antenna gain difference between a communication control apparatus from which the control information is acquired and a terminal apparatus from which uplink transmission is performed in a case where the beamforming process is performed.

20. An information processing apparatus comprising:
a memory configured to store a program; and
one or more processors configured to be able to execute the program,
wherein the program executes
acquiring control information for determining uplink transmission power in accordance with a beamforming process to be performed, and
controlling the uplink transmission power on the basis of the control information, and
wherein the control information includes gain-related information about an antenna gain difference between a communication control apparatus from which the control information is acquired and a terminal apparatus from which uplink transmission is performed in a case where the beamforming process is performed.

* * * * *